United States Patent
Dai et al.

(10) Patent No.: US 10,088,653 B2
(45) Date of Patent: Oct. 2, 2018

(54) CAMERA LENS ASSEMBLY

(71) Applicant: ZHEJIANG SUNNY OPTICS CO., LTD., Ningbo (CN)

(72) Inventors: Fujian Dai, Ningbo (CN); Lin Huang, Ningbo (CN)

(73) Assignee: ZHEJIANG SUNNY OPTICS CO., LTD., Ningbo (CN)

(*) Notice: Subject to any disclaimer, the term of this patent is extended or adjusted under 35 U.S.C. 154(b) by 178 days.

(21) Appl. No.: 15/197,201

(22) Filed: Jun. 29, 2016

(65) Prior Publication Data
US 2016/0349489 A1 Dec. 1, 2016
US 2018/0180849 A2 Jun. 28, 2018

Related U.S. Application Data

(63) Continuation of application No. PCT/CN2015/093120, filed on Oct. 28, 2015.

(30) Foreign Application Priority Data

Apr. 10, 2015 (CN) .......................... 2015 1 0168609

(51) Int. Cl.
*G02B 13/18* (2006.01)
*G02B 9/60* (2006.01)
(Continued)

(52) U.S. Cl.
CPC .......... *G02B 13/0045* (2013.01); *G02B 9/60* (2013.01); *G02B 27/0025* (2013.01); *G02B 5/005* (2013.01); *G02B 13/18* (2013.01)

(58) Field of Classification Search
CPC .. G02B 13/0045; G02B 9/60; G02B 27/0025; G02B 13/18; G02B 5/005
(Continued)

(56) References Cited

U.S. PATENT DOCUMENTS 8,305,697 B1 * 11/2012 Chen .................. G02B 13/0045
359/714
8,908,295 B1 * 12/2014 Tsai .......................... G02B 9/60
359/713
(Continued)

FOREIGN PATENT DOCUMENTS

CN 202693892 U 1/2013
CN 103364924 A 10/2013
(Continued)

OTHER PUBLICATIONS

International Search Report dated Jan. 15, 2016, in corresponding International Application No. PCT/CN2015/093120 (6 pages).
(Continued)

*Primary Examiner* — Evelyn A Lester
(74) *Attorney, Agent, or Firm* — Osha Liang LLP

(57) ABSTRACT

Provided is a camera lens assembly, including a first lens, a second lens, a third lens, a fourth lens and a fifth lens from an object side of the camera lens assembly to an image side of the camera lens assembly in turn. The first lens is of a positive focal power, an object side surface of the first lens is convex and an image side surface of the first is concave; the second lens is of a focal power; the third lens is of a negative focal power; the fourth lens is of a positive focal power, an image side surface of the fourth lens is convex; the fifth lens is of a negative focal power, and at least one inflection point is present in at least one of object and image side surfaces of the fifth lens. The camera lens assembly meets the following formulas: $TTL/2Y \leq 0.7$; and $-0.7 < f/f3 < -0.3$.

17 Claims, 25 Drawing Sheets

(51) Int. Cl.
*G02B 13/00* (2006.01)
*G02B 27/00* (2006.01)
*G02B 5/00* (2006.01)

(58) Field of Classification Search
USPC .................. 359/714, 739, 740, 763, 767
See application file for complete search history.

(56) References Cited

U.S. PATENT DOCUMENTS

| | | | |
|---|---|---|---|
| 2012/0021802 A1* | 1/2012 | Sano | G02B 13/0045 359/714 |
| 2012/0092778 A1* | 4/2012 | Tsai | G02B 13/0045 359/714 |
| 2012/0300316 A1* | 11/2012 | Tsai | G02B 13/0045 359/714 |
| 2012/0314302 A1* | 12/2012 | Tang | G02B 13/0045 359/714 |
| 2013/0057968 A1* | 3/2013 | Tang | G02B 13/0045 359/714 |
| 2013/0215521 A1* | 8/2013 | Chen | G02B 9/60 359/714 |
| 2013/0265650 A1 | 10/2013 | Chen et al. | |
| 2013/0271642 A1 | 10/2013 | Sano | |

FOREIGN PATENT DOCUMENTS

| | | |
|---|---|---|
| CN | 104101983 A | 10/2014 |
| CN | 104375260 A | 2/2015 |
| JP | 2013156389 A | 8/2013 |
| JP | 2013190574 A | 9/2013 |
| WO | 2013137312 A1 | 9/2013 |
| WO | 2015005417 A1 | 1/2015 |

OTHER PUBLICATIONS

Office Action issued in corresponding Japanese Application No. 2016-544399, dated Jun. 27, 2017 (16 pages).
Written Opinion dated Jan. 25, 2016, in corresponding International Application No. PCT/CN2015/093120 (5 pages).

* cited by examiner

CAMERA LENS ASSEMBLY

CROSS-REFERENCE TO RELATED APPLICATION

The application is a continuation of PCT Application No. PCT/CN2015/093120 filed on Oct. 28, 2015, which claims a priority to and benefits of Chinese Patent Applications No. 201510168609.4, filed with the State Intellectual Property Office of P. R. China on Apr. 10, 2015, the entire contents of both of which are incorporated herein by reference.

FIELD

The present disclosure relates to an imaging technology, in particularly to a camera lens assembly.

BACKGROUND

With the developments in technology, it has been springing up recently of portable electronic products, in particular, it has been favouring for people to use portable electronic products with camera function. As for a conventional optical system, a photosensitive element therein may be anything other than a charge-coupled device (CCD) or a complementary metal-oxide semiconductor (CMOS). Along with improvements in the technology of semiconductor manufacturing process, the photosensitive component is of a reduced-size of pixel. Accordingly, the camera lens assembly of the optical system is required to be smaller, so as to facilitate the miniaturization. In addition, the imaging quality of the camera lens assembly is further improved in need, so as to match the photosensitive element.

SUMMARY

Embodiments of the present disclosure seek to solve at least one of the problems existing in the related art.

One object of the present disclosure is to provide a camera lens assembly, including a first lens, a second lens, a third lens, a fourth lens and a fifth lens from an object side of the camera lens assembly to an image side of the camera lens assembly in turn, wherein the first lens is of a positive focal power, an object side surface of the first lens is convex and an image side surface of the first lens is concave;

the second lens is of a focal power;

the third lens is of a negative focal power;

the fourth lens is of a positive focal power, an image side surface of the fourth lens is convex;

the fifth lens is of a negative focal power, and at least one inflection point is present in at least one of object and image side surfaces of the fifth lens;

the camera lens assembly includes:

an aperture stop arranged between a subject and the second lens;

the camera lens assembly meets the following formulas:

$TTL/2Y \leq 0.7$; and $-0.7 < f/f3 < -0.3$, wherein TTL is a total length of the camera lens assembly, Y equals to half-length of a diagonal of an effective pixel region at an imaging side surface, f represents an effective focal length of the camera lens assembly, and f3 represents an effective focal length of the third lens.

In some embodiments, the first lens is made of a glass or plastic material.

In some embodiments, the camera lens assembly meets the following formula:

$V1-V3 > 30$, wherein V1 represents an abbe coefficient of the first lens, and

V3 represents an abbe coefficient of the third lens.

In some embodiments, the camera lens assembly meets the following formula:

$-0.7 < SAG42/SD42 < -0.3$, wherein SAG42 is a sagittal height of the image side surface of the fourth lens, and SD42 is a maximal effective radius of the image side surface of the fourth lens.

In some embodiments, the camera lens assembly meets the following formula:

$-0.75 < f1/f3 < -0.35$, wherein f1 represents an effective focal length of the first lens.

In some embodiments, the camera lens assembly meets the following formula:

$-0.6 < (R1-R2)/(R1+R2) < -0.3$, wherein R1 represents a curvature radius of the object side surface of the first lens, and R2 represents a curvature radius of the image side surface of the first lens.

In some embodiments, the camera lens assembly meets the following formulas:

$0.5 < f/f4 < 2.5$; and $R6/R7 > 0$, wherein f4 represents an effective focal length of the fourth lens, R6 represents a curvature radius of an image side surface of the third lens, and R7 represents a curvature radius of the object side surface of the fourth lens.

In some embodiments, the camera lens assembly meets the following formula:

$-3 < f/f5 < -1$, wherein f5 represents an effective focal length of the fifth lens.

In some embodiments, an object side surface of the second lens is concave, and an image side surface of the second lens is convex.

In some embodiments, an object side surface of the third lens is concave.

In some embodiments, the image side surface of the fifth lens is concave.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
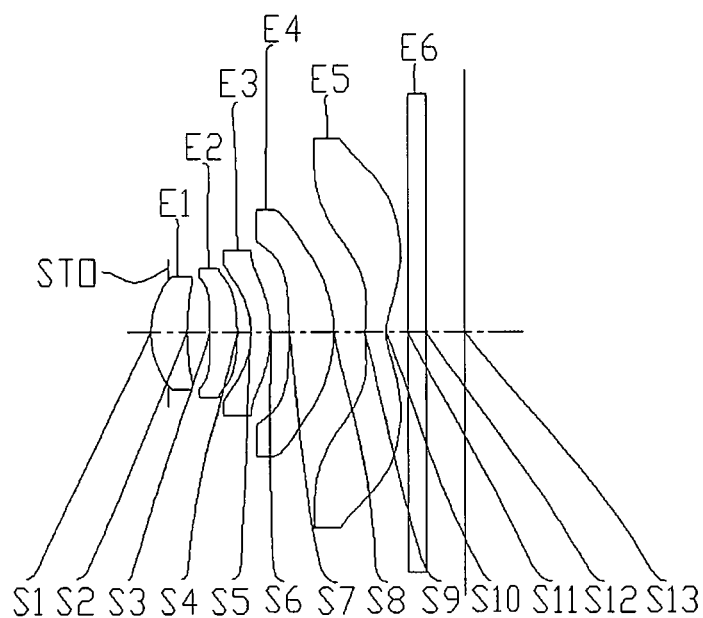
FIG. 1 is a schematic view showing the camera lens assembly according to Example 1 of the present disclosure.

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present invention.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, unless specified otherwise, "a plurality of" means two or more than two.

In the description of the present disclosure, it should be noted that, unless otherwise clearly defined and limited, the terms "mounted", "connected", "connection" should be broadly understood, and may be, for example, fixed connections, detachable connections, or integral connections;

may also be electrical connections or may communicate with each other; may also be direct connections or indirect connections via intermediation; may also be inner communications or interaction relationship of two elements, which can be understood by those ordinary skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under", or "on bottom of" the second feature, or just means that the first feature is at a height lower than that of the second feature.

Various embodiments and examples are provided in the following descriptions to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

With reference to FIG. 1, there is provided in embodiments a camera lens assembly, including a first lens E1 being of a positive focal power, a second lens E2 being of a focal power, a third lens E3 being of a negative focal power, a fourth lens E4 being of a positive focal power and a fifth lens E5 being of a negative focal power.

The first lens E1 includes an object side surface S1 and an image side surface S2. The second lens E2 includes an object side surface S3 and an image side surface S4. The third lens E3 includes an object side surface S5 and an image side surface S6. The fourth lens E4 includes an object side surface S7 and an image side surface S8. The fifth lens E5 includes an object side surface S9 and an image side surface S10. The object side surface S1 is convex, and the image side surface S2 is concave. The image side surface S8 is convex. At least one inflection point is present in at least one of the object side surface S9 and the image side surfaces S10.

The camera lens assembly includes an aperture stop STO arranged between a subject and the second lens.

The camera lens assembly meets the following formulas:

$TTL/2Y \leq 0.7$; and $-0.7 < f/f3 < -0.3$, in which TTL is a total length of the camera lens assembly, Y equals to half-length of a diagonal of an effective pixel region at an imaging side surface S13, f represents an effective focal length of the camera lens assembly, and f3 represents an effective focal length of the third lens E3.

Meeting the requirements in such formulas contributes to shortening the length of the camera lens assembly, enlarging the field angle and improving the imaging quality.

The first lens E1 is made of a glass or plastic material. In the case that the first lens E1 is made of the glass material, the imaging quality is better, and in the case that the first lens E1 is made of the plastic material, the cost is low and it is easy for manufacture.

The camera lens assembly meets the following formula:

$V1-V3>30$, in which V1 represents an abbe coefficient of the first lens E1 and V3 represents an abbe coefficient of the third lens E3.

Meeting the requirement in such a formula contributes to reducing chromatic aberration of the camera lens assembly.

The camera lens assembly meets the following formula:

$-0.7 < SAG42/SD42 < -0.3$, in which SAG42 is a sagittal height of the image side surface S8, and SD42 is a maximal effective radius of the image side surface of the fourth lens.

Meeting the requirement in such a formula for the fourth lens E4 and combining with the shape of the fifth lens E5, contribute to reducing an incident angle of main light at the imaging side surface S13, decreasing the possibility of generating vignetting and improving the imaging quality.

The camera lens assembly meets the following formula:

$-0.75 < f1/f3 < -0.35$, in which f1 represents an effective focal length of the first lens E1.

Meeting the requirement in such a formula contributes to enlarging the field angle of the camera lens assembly.

The camera lens assembly meets the following formula:

$-0.6 < (R1-R2)/(R1+R2) < -0.3$, in which R1 represents a curvature radius of the object side surface S1, and R2 represents a curvature radius of the image side surface S2.

Meeting the requirement to the shape of the first lens E1 in such a formula contributes to enlarging the field angle of the camera lens assembly.

The camera lens assembly meets the following formulas:

$0.5 < f/f4 < 2.5$; and $R6/R7 > 0$, in which f4 represents an effective focal length of the fourth lens E4, R6 represents a curvature radius of the image side surface S6, and R7 represents a curvature radius of the object side surface S7.

Meeting the requirement in such a formula contributes to miniaturization of the camera lens assembly.

The camera lens assembly meets the following formula:

$-3 < f/f5 < -1$, in which f5 represents an effective focal length of the fifth lens E5.

Meeting the requirement in such a formula contributes to improving the imaging quality of the camera lens assembly.

The object side surface S3 is concave, the image side surface S4 is convex, the object side surface S5 is concave, and the image side surface S10 is concave.

Meeting the requirement to the respective shape of the second lens E2, the third lens E3 and the fifth lens E5 contributes to further improving imaging quality and reducing the total length of the camera lens assembly.

During imaging, light passes through five lenses, and then is imaged at the image side surface S13 after passing through a light filter E6 including an object side surface S11 and an image side surface S12.

In some embodiments, the first lens E1, the second lens E2, the third lens E3, the fourth lens E4 and the fifth lens E5 may all be aspheric shape lenses.

A surface shape of the aspheric shape is defined by a formula as below:

$$x = \frac{ch^2}{1+\sqrt{1-(k+1)c^2h^2}} + \sum A_i h^i$$

in which h is a height from any point on the aspheric shape to an optical axis, c is an apex curvature, k is a conic coefficient, Ai is a coefficient for the i-th order of the aspheric.

Example 1

In example 1, the camera lens assembly meets the conditions in the following tables:

TABLE 1

| Surface No. | Surface type | Curvature radius | Thickness | refractive index/abbe | Conic coefficient |
|---|---|---|---|---|---|
| obj | spherical | infinity | infinity | | 0.0000 |
| STO | spherical | infinity | −0.1920 | | 0.0000 |
| S1 | aspheric | 1.0867 | 0.4159 | 1.5, 81.6 | −1.2326 |
| S2 | aspheric | 3.0165 | 0.2601 | | −0.2885 |
| S3 | aspheric | −7.4795 | 0.3087 | 1.54, 56.1 | 11.1977 |
| S4 | aspheric | −2.3886 | 0.1547 | | −9.8211 |
| S5 | aspheric | −1.1136 | 0.2236 | 1.64, 23.5 | −0.9701 |
| S6 | aspheric | −1.6554 | 0.2162 | | −3.9826 |
| S7 | aspheric | −7.0527 | 0.5164 | 1.54, 56.1 | −48.9908 |
| S8 | aspheric | −1.3924 | 0.3545 | | −4.5555 |
| S9 | aspheric | 1.8335 | 0.2445 | 1.54, 56.1 | −83.6932 |
| S10 | aspheric | 0.6528 | 0.2465 | | −6.5551 |
| S11 | spherical | infinity | 0.2100 | 1.52, 64.2 | 0.0000 |
| S12 | spherical | infinity | 0.4363 | | 0.0000 |
| S13 | spherical | infinity | | | 0.0000 |

TABLE 2

| Surface No. | A4 | A6 | A8 | A10 | A12 | A14 | A16 |
|---|---|---|---|---|---|---|---|
| S1 | 1.3767E−01 | 6.1768E−01 | −6.7302E+00 | 4.2966E+01 | −1.4295E+02 | 2.4320E+02 | −1.6678E+02 |
| S2 | 3.9916E−02 | 4.0865E−02 | 1.0276E−01 | −3.7643E+00 | 1.4487E+01 | −1.9841E+01 | −8.1047E+00 |
| S3 | −2.1066E−01 | 1.8464E−01 | −6.8090E+00 | 4.0095E+01 | −1.2353E+02 | 1.5320E+02 | −5.9402E+01 |
| S4 | −3.5616E−01 | −8.7125E−01 | 1.1010E+01 | −6.7363E+01 | 2.0570E+02 | −3.3011E+02 | 2.2166E+02 |
| S5 | −4.5928E−01 | 2.6336E+00 | −1.5783E+01 | 6.9255E+01 | −1.8369E+02 | 2.5064E+02 | −1.3214E+02 |
| S6 | −3.1652E−01 | 9.1303E−01 | −2.8497E+00 | 8.3432E+00 | −1.4930E+01 | 1.3922E+01 | −5.0613E+00 |
| S7 | 4.3589E−02 | −9.8024E−01 | 2.8448E+00 | −5.8608E+00 | 7.3961E+00 | −5.1553E+00 | 1.4866E+00 |
| S8 | 4.8934E−02 | −2.8889E−01 | 1.8786E−01 | 6.8892E−02 | −1.2908E−01 | 5.7890E−02 | −9.5115E−03 |
| S9 | −6.8389E−01 | −5.6041E−01 | −2.3689E−01 | 6.1996E−02 | −1.0263E−02 | 9.9932E−04 | −4.3995E−05 |
| S10 | −3.3112E−01 | 2.7560E−01 | −1.4450E−01 | 4.7221E−02 | −9.5605E−03 | 1.0903E−03 | −5.2675E−05 |

Furthermore, f1=3.18 mm; f2=6.29 mm; f3=−6.3 mm; f4=3.08 mml f5=−2.0 mm; f=3.0 mm; HFOV=45.5°; TTL=3.59 mm; Fno: 2.4.

Figure 2:
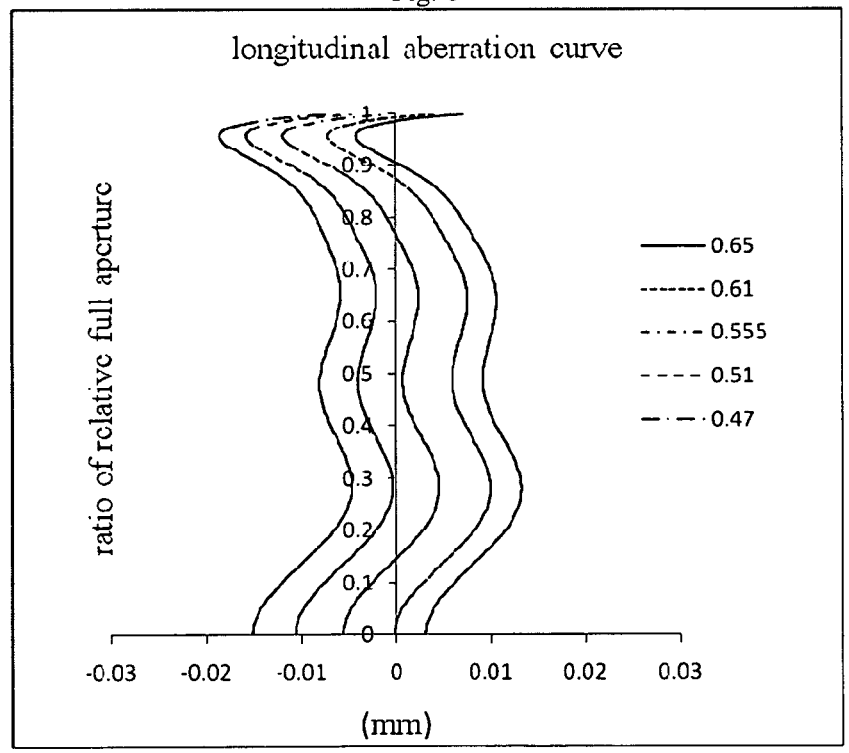
FIG. 2 is a diagram showing a longitudinal aberration curve (mm) of the camera lens assembly in Example 1.
Figure 3:
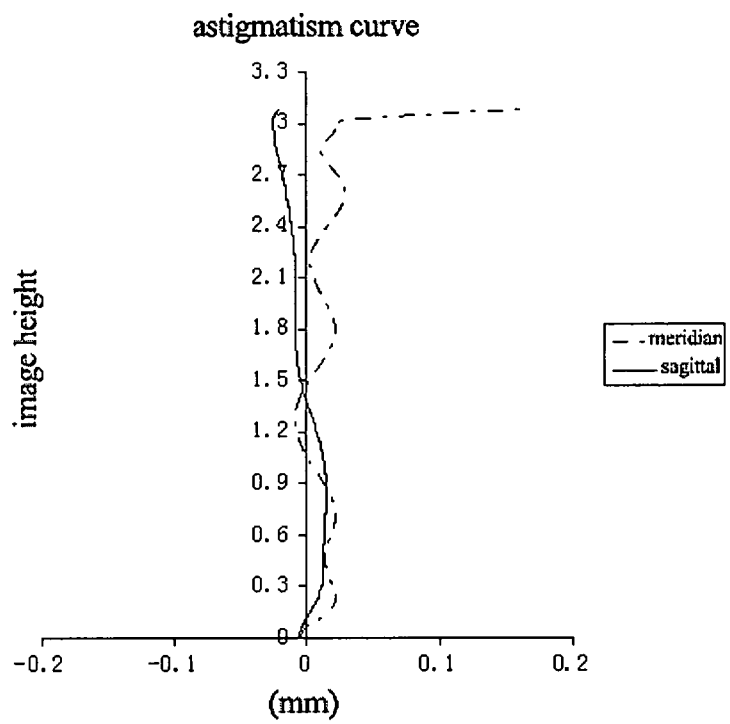
FIG. 3 is a diagram showing an astigmatism curve (mm) of the camera lens assembly in Example 1.
Figure 4:
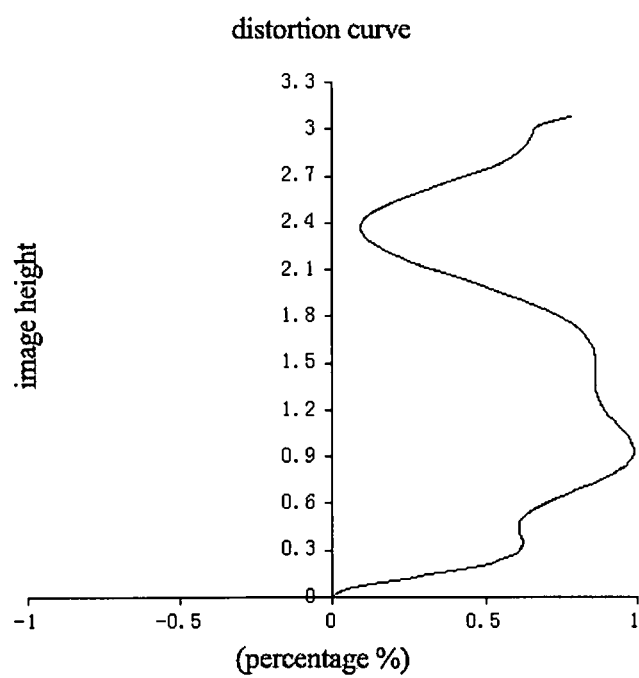
FIG. 4 is a diagram showing a distortion curve (%) of the camera lens assembly in Example 1.
Figure 5:
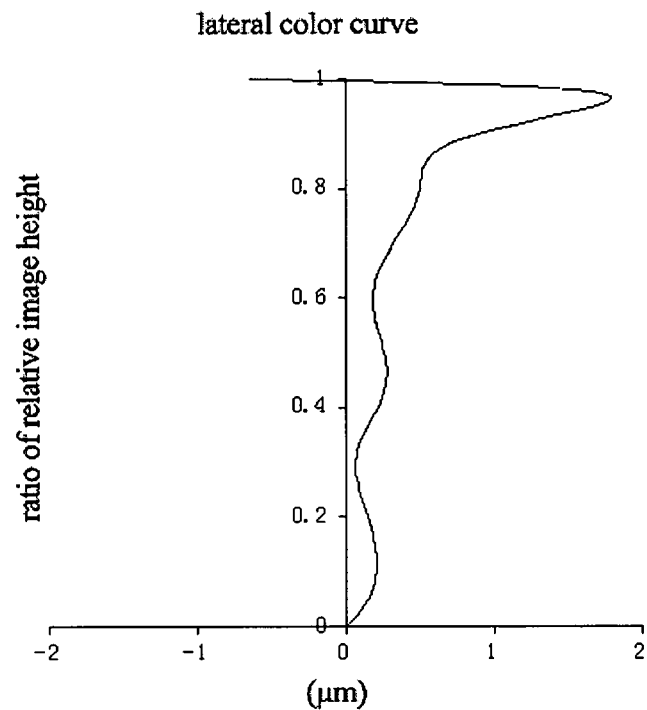
FIG. 5 is a diagram showing a lateral color curve (m) of the camera lens assembly in Example 1.

According to the configuration shown in FIG. 1, the light filter E6 included in the camera lens assembly may effectively filter out invisible light, thereby allowing the camera lens assembly to be more applicable to visible light. FIG. 2 is obtained by imputing data as shown in Tables 1 and 2 into an optical designing software ZEMAX (ZEMAX OpticStudio, LLC company, Version 2016) or CODE V (Synopsys, Inc, Version 10.8) with setting Fno. to be 2.4.

Example 2

Figure 6:
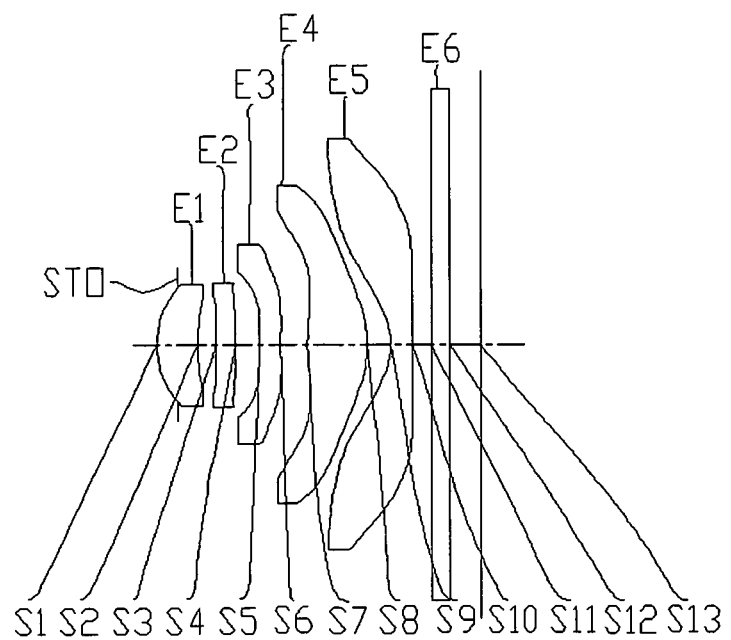
FIG. 6 is a schematic view showing the camera lens assembly according to Example 2 of the present disclosure.
Figure 7:
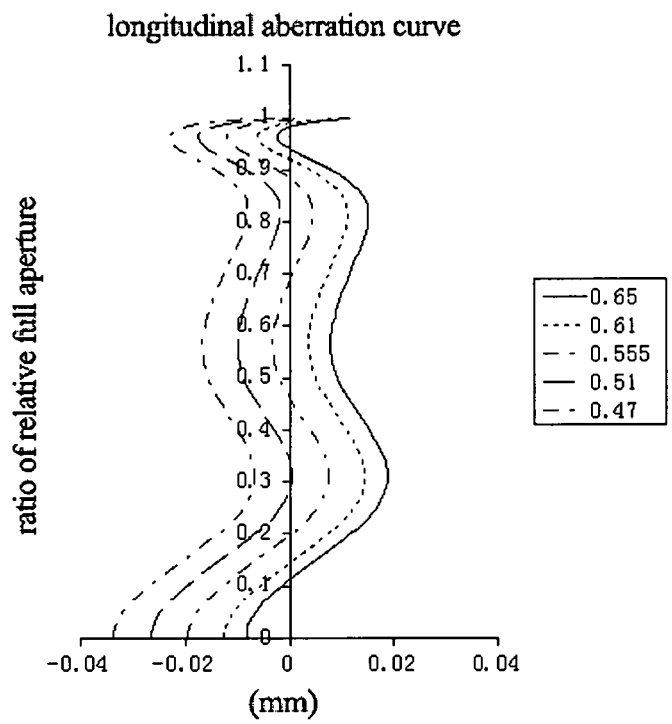
FIG. 7 is a diagram showing a longitudinal aberration curve (mm) of the camera lens assembly in Example 2.
Figure 8:
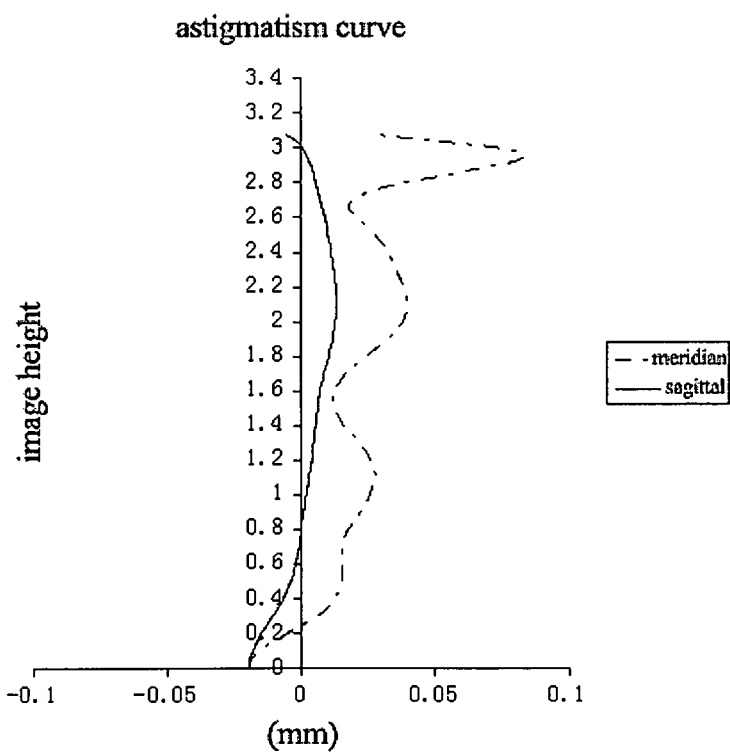
FIG. 8 is a diagram showing an astigmatism curve (mm) of the camera lens assembly in Example 2.
Figure 9:
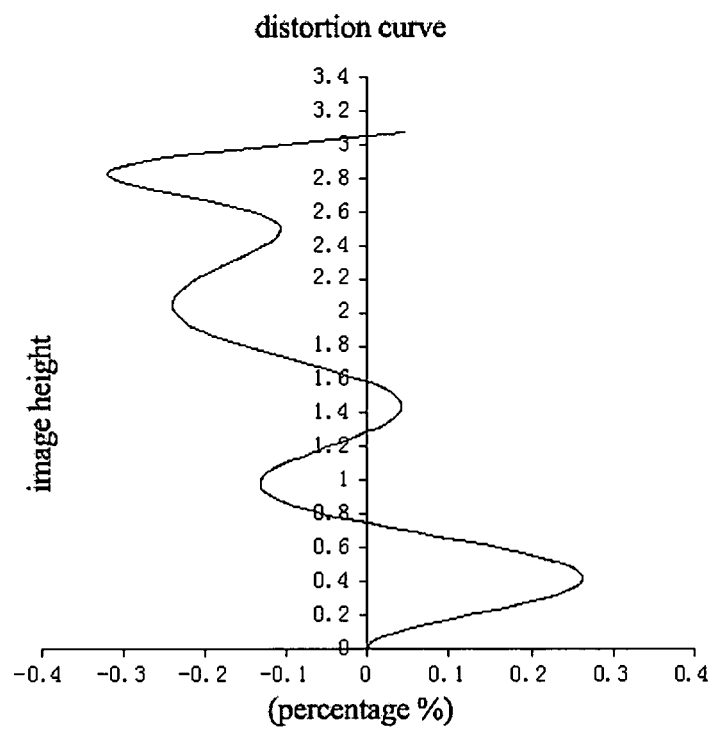
FIG. 9 is a diagram showing a distortion curve (%) of the camera lens assembly in Example 2.
Figure 10:
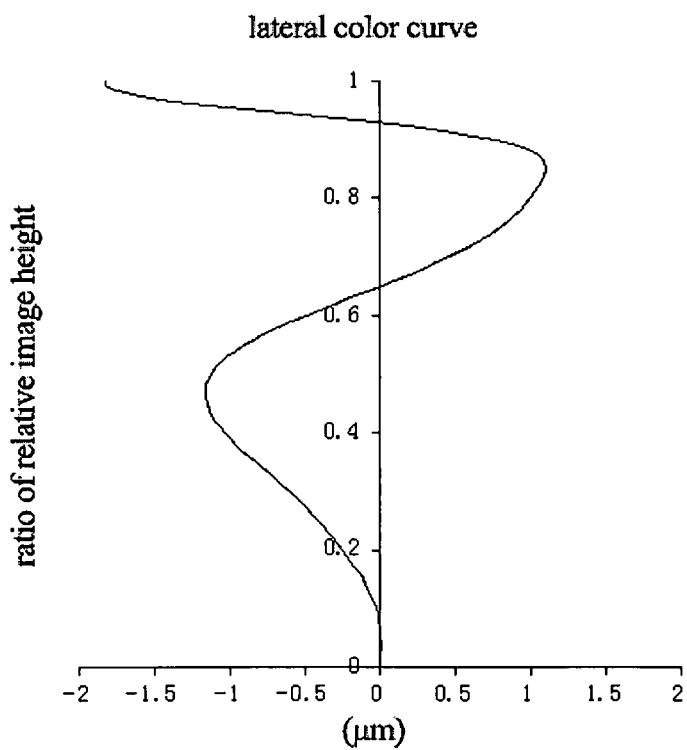
FIG. 10 is a diagram showing a lateral color curve (μm) of the camera lens assembly in Example 2.

With reference to FIG. 6, in example 2, the camera lens assembly meets the conditions in the following tables:

TABLE 3

| Surface No. | Surface type | Curvature radius | Thickness | refractive index/abbe | Conic coefficient |
|---|---|---|---|---|---|
| obj | spherical | infinity | infinity | | 0.0000 |
| STO | spherical | infinity | −0.2297 | | 0.0000 |
| S1 | aspheric | 1.0260 | 0.4542 | 1.5, 81.6 | −1.1934 |
| S2 | aspheric | 2.4860 | 0.2029 | | −24.2076 |
| S3 | aspheric | −272.0540 | 0.2181 | 1.54, 56.1 | −1.0154 |
| S4 | aspheric | −20.0575 | 0.2676 | | −112.6261 |
| S5 | aspheric | −111.9075 | 0.2304 | 1.64, 23.5 | −150.0124 |
| S6 | aspheric | 5.2634 | 0.2990 | | 4.3470 |
| S7 | aspheric | 3.7060 | 0.6616 | 1.54, 56.1 | −7.6019 |
| S8 | aspheric | −1.2901 | 0.2625 | | −10.4429 |
| S9 | aspheric | −0.7922 | 0.2400 | 1.54, 56.1 | −1.1568 |
| S10 | aspheric | 172.8736 | 0.2053 | | −0.9720 |
| S11 | spherical | infinity | 0.2100 | 1.52, 64.2 | 0.0000 |
| S12 | spherical | infinity | 0.3336 | | 0.0000 |
| S13 | spherical | infinity | | | 0.0000 |

TABLE 4

| Surface No. | A4 | A6 | A8 | A10 | A12 | A14 | A16 |
|---|---|---|---|---|---|---|---|
| S1 | 1.0317E−01 | 9.5130E−01 | −7.7813E+00 | 3.8895E+01 | −1.0986E+02 | 1.6427E+02 | −1.0105E+02 |
| S2 | 1.8801E−01 | −3.0722E−01 | −7.9883E−01 | 7.0926E+00 | −2.7520E+01 | 3.9419E+01 | −1.5973E+01 |
| S3 | −2.7940E−01 | 1.2863E+00 | −1.4384E+01 | 7.5291E+01 | −2.2347E+02 | 3.3796E+02 | −1.8718E+02 |
| S4 | −1.9976E−01 | −6.6446E−01 | 8.5894E+00 | −5.3083E+01 | 1.7463E+02 | −2.9376E+02 | 2.1107E+02 |
| S5 | −6.5552E−01 | 5.6711E−01 | 6.0565E−01 | −1.1178E+01 | 3.6173E+01 | −5.3029E+01 | 3.0089E+01 |
| S6 | −6.7234E−01 | 1.0110E+00 | −1.8880E+00 | 2.4685E+00 | −1.5793E+00 | 4.3804E−01 | −4.4434E−02 |
| S7 | −2.2896E−01 | 2.1485E−01 | −2.7488E−01 | 1.4744E−01 | −1.8371E−02 | −6.1882E−03 | 1.3253E−03 |
| S8 | −3.8139E−01 | 7.2565E−01 | −6.5147E−01 | 3.2064E−01 | −8.8560E−02 | 1.2709E−02 | −7.3129E−04 |
| S9 | 2.2123E−01 | −5.2748E−02 | 6.0959E−03 | −3.4383E−04 | 8.7118E−06 | 1.2530E−08 | 1.4964E−08 |
| S10 | 1.2951E−02 | −2.7415E−02 | 6.3843E−03 | −6.2065E−04 | 2.7847E−05 | −5.3167E−02 | 2.4002E−08 |

Furthermore, f1=3.18 mm; f2=39.65 mm; f3=−7.79 mm; f4=1.84 mm; f5=−1.44 mm; f=3.13 mm; HFOV=44.2°; TTL=3.58 mm; Fno: 2.4.

Example 3

Figure 11:
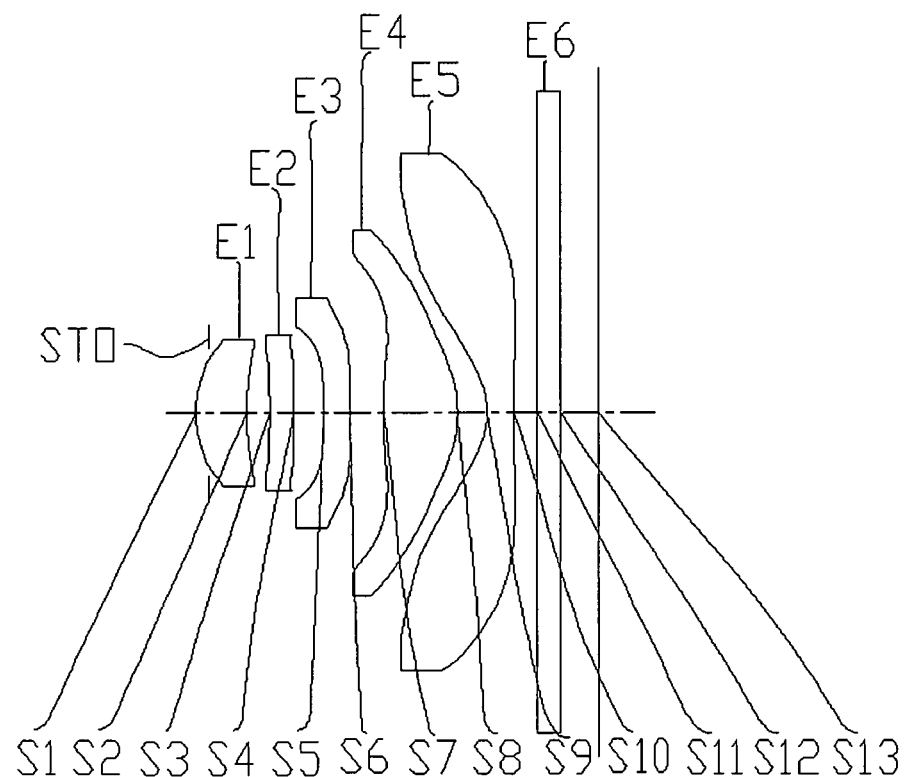
FIG. 11 is a schematic view showing the camera lens assembly according to Example 3 of the present disclosure.
Figure 12:
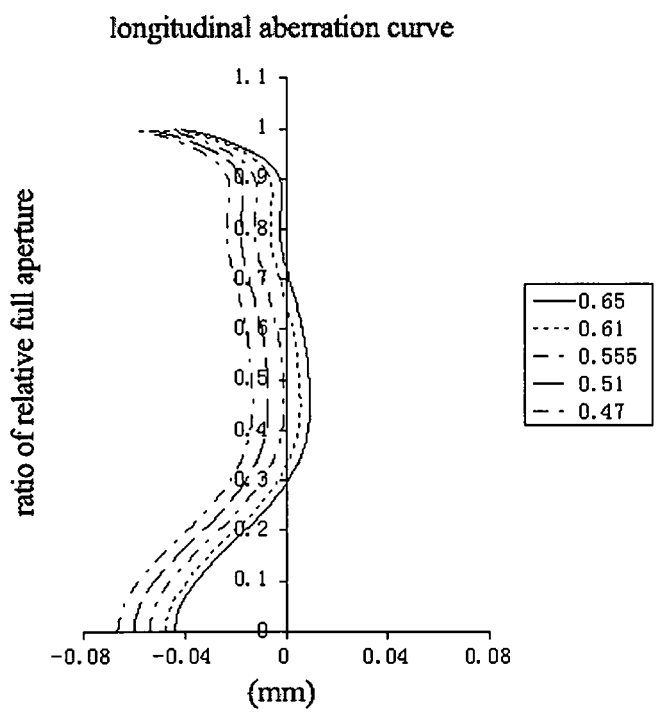
FIG. 12 is a diagram showing a longitudinal aberration curve (mm) of the camera lens assembly in Example 3.
Figure 13:
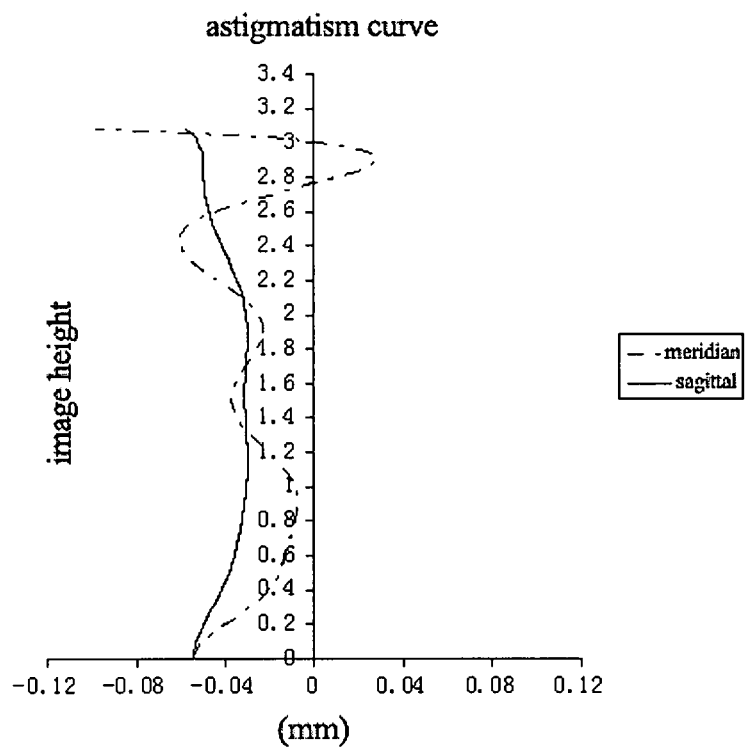
FIG. 13 is a diagram showing an astigmatism curve (mm) of the camera lens assembly in Example 3.
Figure 14:
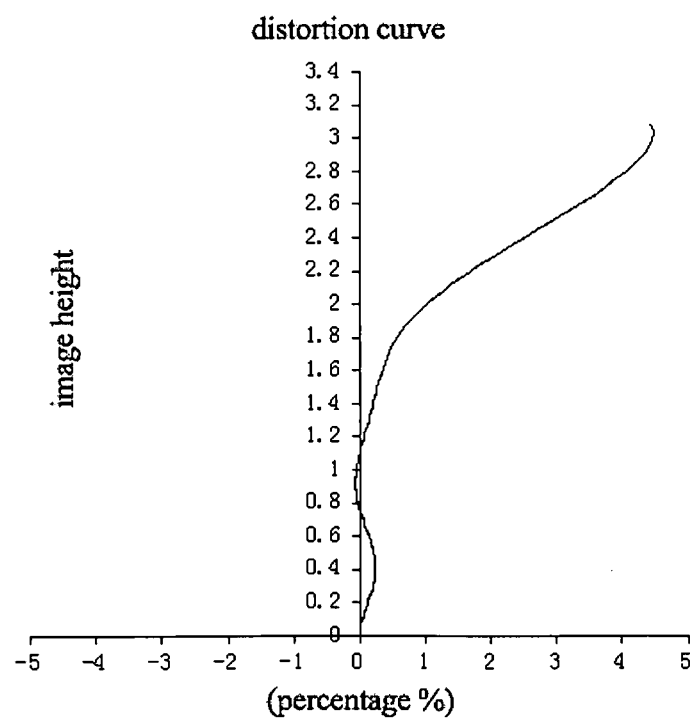
FIG. 14 is a diagram showing a distortion curve (%) of the camera lens assembly in Example 3.
Figure 15:
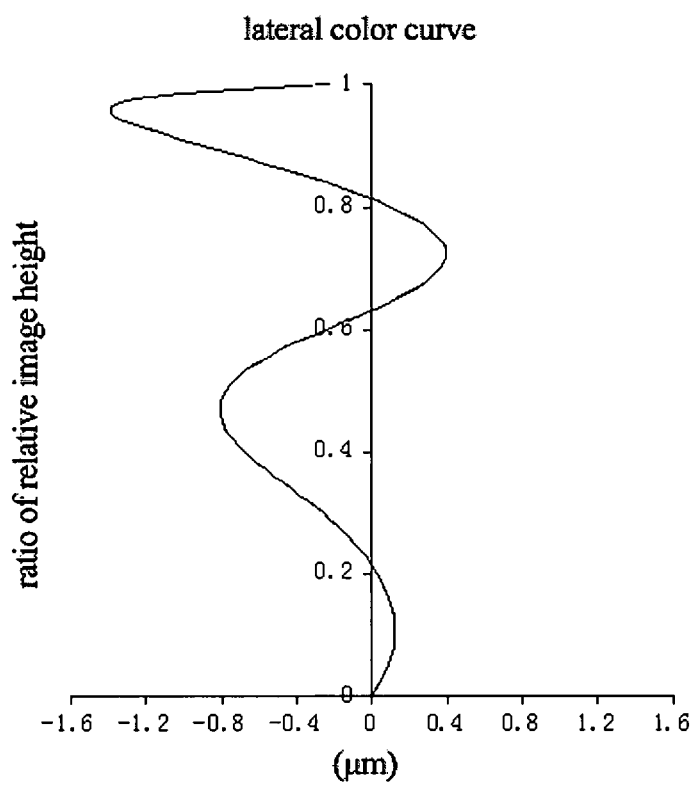
FIG. 15 is a diagram showing a lateral color curve (μm) of the camera lens assembly in Example 3.

With reference to FIG. 11, in example 3, the camera lens assembly meets the conditions in the following tables:

TABLE 5

| Surface No. | Surface type | Curvature radius | Thickness | refractive index/abbe | Conic coefficient |
|---|---|---|---|---|---|
| obj | spherical | infinity | infinity | | 0.0000 |
| STO | spherical | infinity | −0.1159 | | 0.0000 |
| S1 | aspheric | 1.0250 | 0.4542 | 1.5, 81.6 | −1.2677 |
| S2 | aspheric | 2.6793 | 0.2029 | | −24.5399 |
| S3 | aspheric | −104.8794 | 0.2181 | 1.54, 56.1 | 100.0000 |
| S4 | aspheric | −129.8826 | 0.2676 | | 100.0000 |
| S5 | aspheric | −93.4349 | 0.2304 | 1.64, 23.5 | −400.0000 |
| S6 | aspheric | 4.7341 | 0.2990 | | −1.1513 |
| S7 | aspheric | 3.1085 | 0.6616 | 1.54, 56.1 | −3.2512 |
| S8 | aspheric | −1.1554 | 0.2625 | | −7.6453 |
| S9 | aspheric | −0.7483 | 0.2400 | 1.54, 56.1 | −1.1698 |
| S10 | aspheric | 104.9499 | 0.2053 | | 100.0000 |
| S11 | spherical | infinity | 0.2100 | 1.52, 64.2 | 0.0000 |
| S12 | spherical | infinity | 0.3336 | | 0.0000 |
| S13 | spherical | infinity | | | 0.0000 |

TABLE 6

| Surface No. | A4 | A6 | A8 | A10 | A12 | A14 | A16 |
|---|---|---|---|---|---|---|---|
| S1 | 9.7353E−02 | 1.0074E+00 | −7.7248E+00 | 3.8790E+01 | −1.1033E+02 | 1.6383E+02 | −9.7050E+01 |
| S2 | 1.8095E−01 | −3.3139E−01 | −7.8232E−01 | 7.2783E+00 | −2.6911E+01 | 4.0538E+01 | −1.7702E+01 |
| S3 | −2.8979E−01 | 1.3222E+00 | −1.4316E+01 | 7.5042E+01 | −2.2518E+02 | 3.3504E+02 | −1.6741E+02 |
| S4 | −2.0468E−01 | −6.6591E−01 | 8.5841E+00 | −5.3158E+01 | 1.7444E+02 | −2.9414E+02 | 2.0961E+02 |
| S5 | −6.8513E−01 | 5.4802E−01 | 5.7675E−01 | −1.1130E+01 | 3.6277E+01 | −5.3219E+01 | 2.8670E+01 |
| S6 | −6.7714E−01 | 9.9508E−01 | −1.8900E+00 | 2.4715E+00 | −1.5768E+00 | 4.3782E−01 | −4.8033E−02 |
| S7 | −2.1812E−01 | 2.1624E−01 | −2.7753E−01 | 1.4636E−01 | −1.8615E−02 | −6.2078E−03 | 1.3503E−03 |
| S8 | −3.9352E−01 | 7.2179E−01 | −6.5080E−01 | 3.2096E−01 | −8.8510E−02 | 1.2707E−02 | −7.3656E−04 |
| S9 | 2.2105E−01 | −5.2882E−02 | 6.0808E−03 | −3.4482E−04 | 8.7561E−06 | 4.9658E−08 | 2.6372E−08 |
| S10 | 1.8697E−02 | −2.6610E−02 | 6.3912E−03 | −6.3345E−04 | 2.5448E−05 | −9.4839E−07 | −5.0732E−08 |

Furthermore, f1=3.05 mm; f2=−1001.1 mm; f3=−6.98 mm; f4=1.63 mm; f5=−1.36 mm; f=3.02 mm; HFOV=43.5°; TTL=3.58 mm; Fno: 2.4.

Example 4

Figure 16:
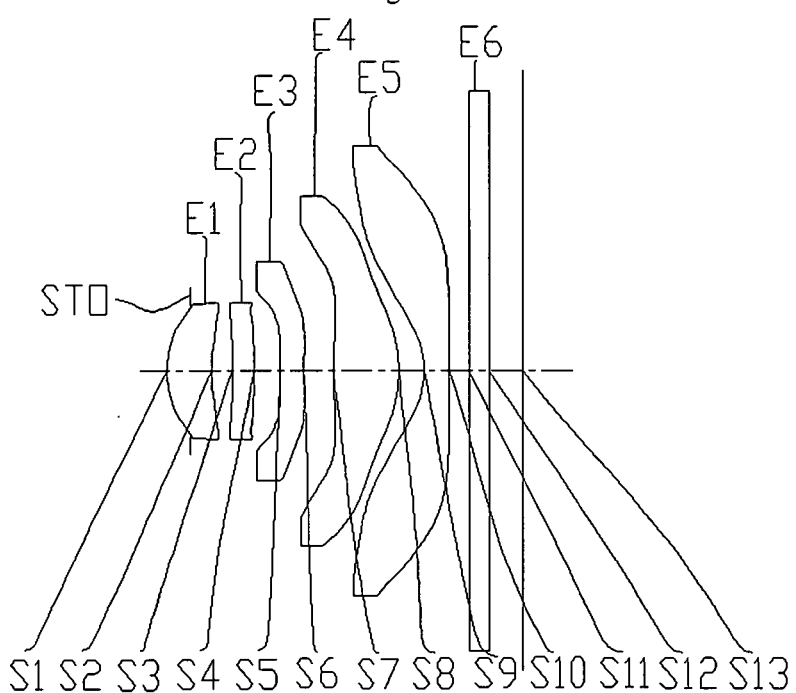
FIG. 16 is a schematic view showing the camera lens assembly according to Example 4 of the present disclosure.
Figure 17:
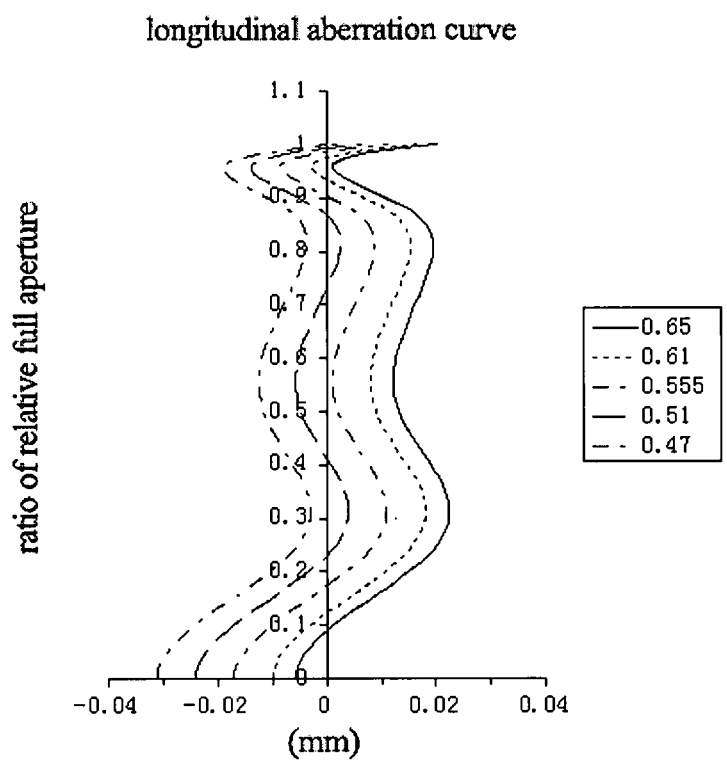
FIG. 17 is a diagram showing a longitudinal aberration curve (mm) of the camera lens assembly in Example 4.
Figure 18:
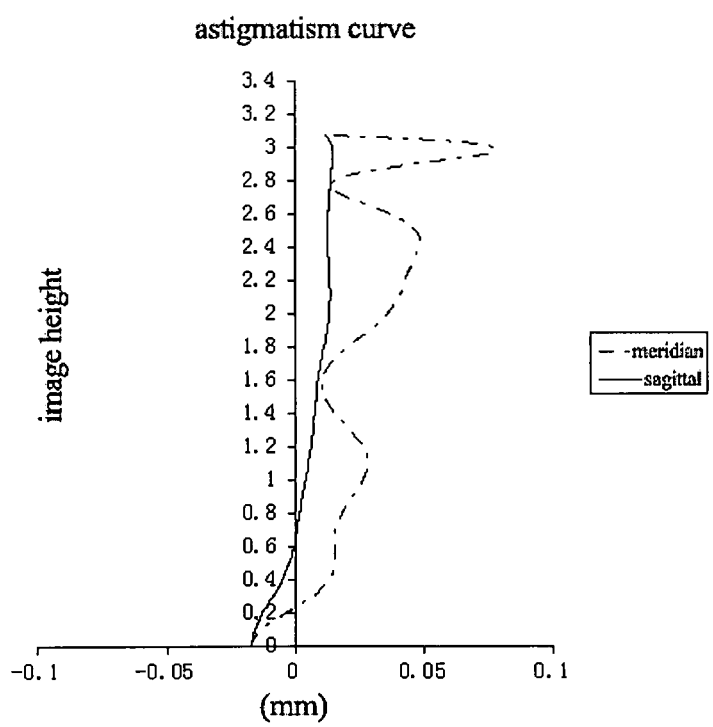
FIG. 18 is a diagram showing an astigmatism curve (mm) of the camera lens assembly in Example 4.
Figure 19:
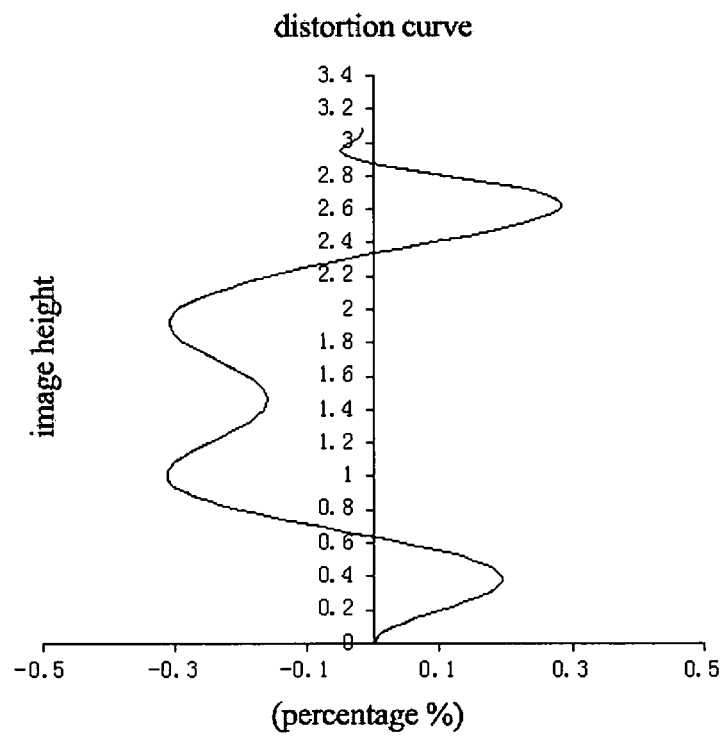
FIG. 19 is a diagram showing a distortion curve (%) of the camera lens assembly in Example 4.
Figure 20:
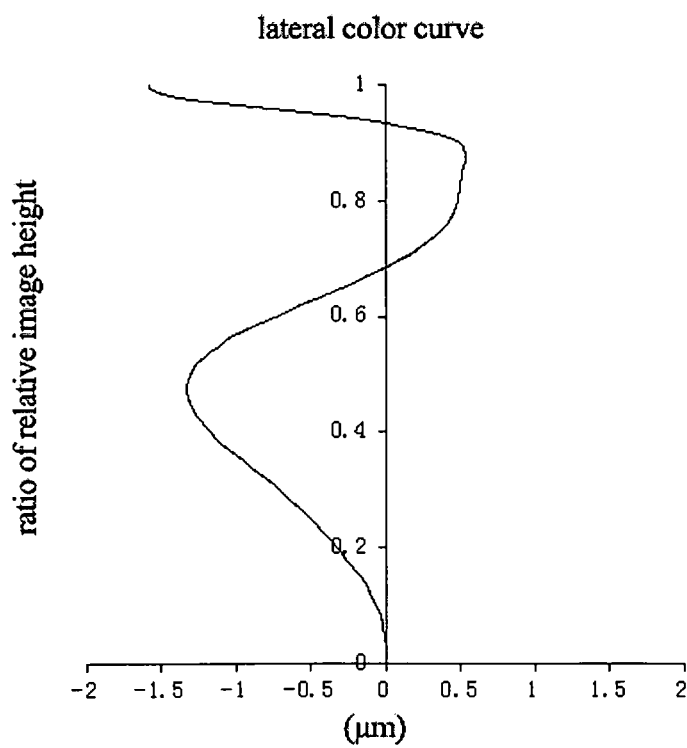
FIG. 20 is a diagram showing a lateral color curve (μm) of the camera lens assembly in Example 4.

With reference to FIG. 16, in example 4, the camera lens assembly meets the conditions in the following tables:

TABLE 7

| Surface No. | Surface type | Curvature radius | Thickness | refractive index/abbe | Conic coefficient |
|---|---|---|---|---|---|
| obj | spherical | infinity | infinity | | 0.0000 |
| STO | spherical | infinity | −0.2300 | | 0.0000 |
| S1 | aspheric | 1.0259 | 0.4542 | 1.5, 81.6 | −1.2005 |
| S2 | aspheric | 2.4816 | 0.2029 | | −24.0841 |
| S3 | aspheric | 373.7610 | 0.2181 | 1.54, 56.1 | 97.4437 |
| S4 | aspheric | −20.1471 | 0.2676 | | −123.7705 |
| S5 | aspheric | −94.1094 | 0.2304 | 1.64, 23.5 | −83.8404 |
| S6 | aspheric | 5.2053 | 0.2990 | | 4.6246 |
| S7 | aspheric | 3.7170 | 0.6616 | 1.54, 56.1 | −7.8003 |
| S8 | aspheric | −1.3029 | 0.2625 | | −10.5199 |
| S9 | aspheric | −0.7813 | 0.2400 | 1.54, 56.1 | −1.1570 |
| S10 | aspheric | −315.5912 | 0.2053 | | 100.0000 |
| S11 | spherical | infinity | 0.2100 | 1.52, 64.2 | 0.0000 |
| S12 | spherical | infinity | 0.3336 | | 0.0000 |
| S13 | spherical | infinity | | | 0.0000 |

TABLE 8

| Surface No. | A4 | A6 | A8 | A10 | A12 | A14 | A16 |
|---|---|---|---|---|---|---|---|
| S1 | 1.0276E−01 | 9.5021E−01 | −7.7839E+00 | 3.8889E+01 | −1.0987E+02 | 1.6424E+02 | −1.0110E+02 |
| S2 | 1.8659E−01 | −3.1328E−01 | −8.1688E−01 | 7.0893E+00 | −2.7525E+01 | 3.9549E+01 | −1.5825E+01 |
| S3 | −2.7985E−01 | 1.2850E+00 | −1.4387E+01 | 7.5291E+01 | −2.2344E+02 | 3.3817E+02 | −1.8585E+02 |
| S4 | −1.9955E−01 | −6.6397E−01 | 8.5898E+00 | −5.3083E+01 | 1.7467E+02 | −2.9363E+02 | 2.1140E+02 |
| S5 | −6.5558E−01 | 5.6606E−01 | 6.0399E−01 | −1.1180E+01 | 3.6171E+01 | −5.3032E+01 | 3.0085E+01 |
| S6 | −6.7201E−01 | 1.0111E+00 | −1.8882E+00 | 2.4683E+00 | −1.5795E+00 | 4.3779E−01 | −4.4438E−02 |
| S7 | −2.2912E−01 | 2.1482E−01 | −2.7488E−01 | 1.4744E−01 | −1.8371E−02 | −6.1882E−03 | 1.3312E−03 |
| S8 | −3.8113E−01 | 7.2563E−01 | −6.5148E−01 | 3.2067E−01 | −8.8557E−02 | 1.2710E−02 | −7.3134E−04 |
| S9 | 2.2123E−01 | −5.2749E−02 | 6.0960E−03 | −3.4378E−04 | 8.7230E−06 | 1.4865E−08 | 1.5417E−08 |
| S10 | 1.3063E−02 | −2.7405E−02 | 6.3850E−03 | −6.2064E−04 | 2.7840E−05 | −5.3377E−07 | 2.3561E−08 |

Furthermore, f1=3.18 mm; f2=35.02 mm; f3=−7.65 mm; f4=1.85 mm; f5=−1.43 mm; f=3.16 mm; HFOV=44.1°; TTL=3.59 mm; Fno: 2.4.

Example 5

Figure 21:
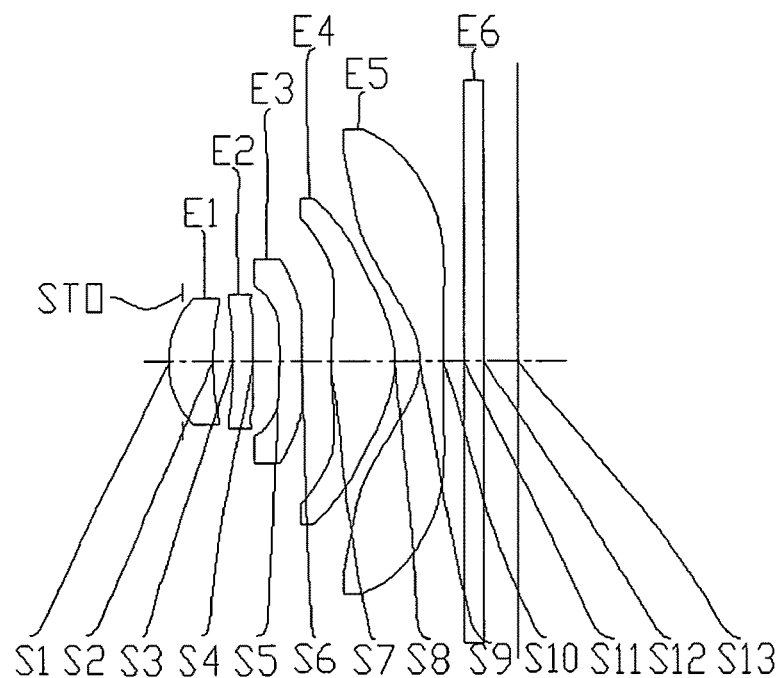
FIG. 21 is a schematic view showing the camera lens assembly according to Example 5 of the present disclosure.
Figure 22:
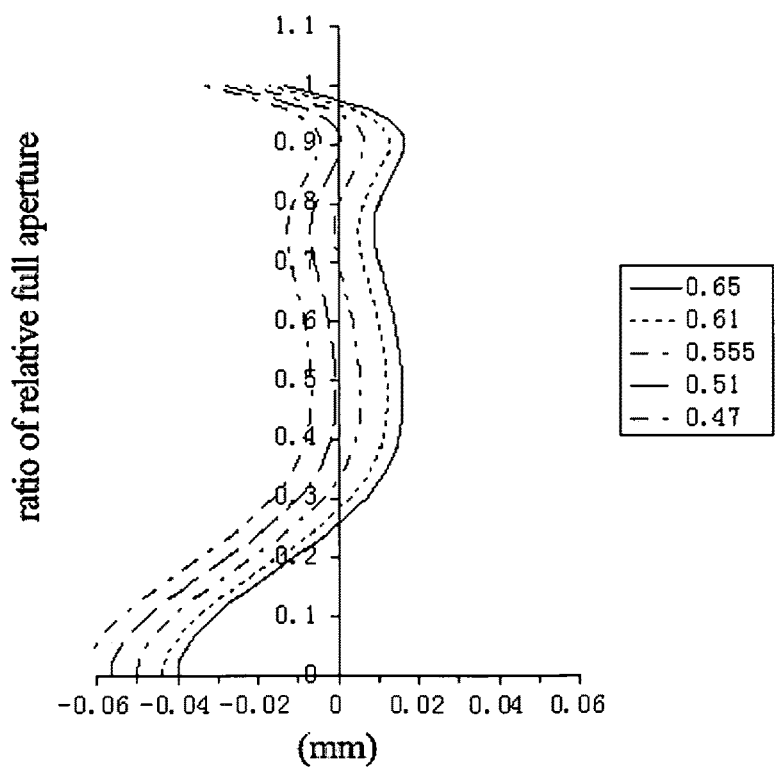
FIG. 22 is a diagram showing a longitudinal aberration curve (mm) of the camera lens assembly in Example 5.
Figure 23:
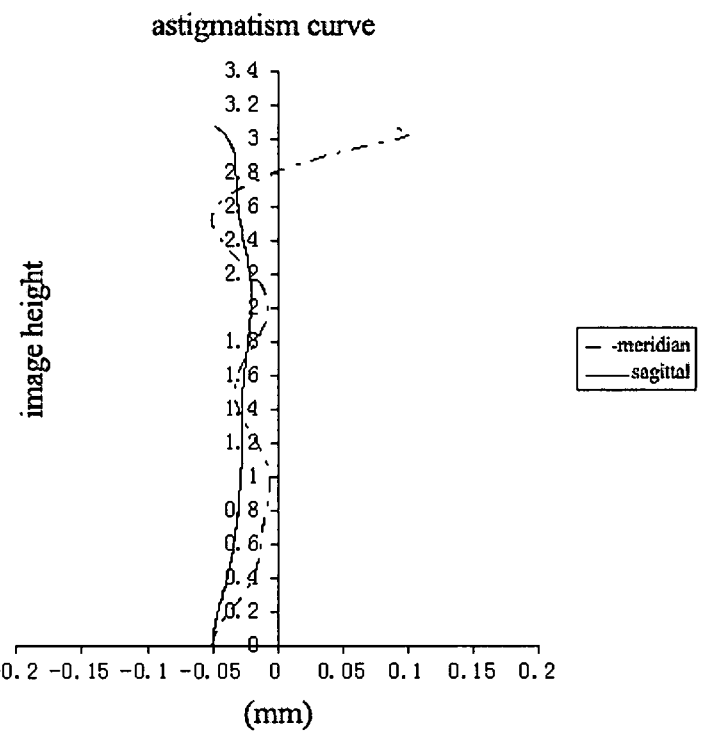
FIG. 23 is a diagram showing an astigmatism curve (mm) of the camera lens assembly in Example 5.
Figure 24:
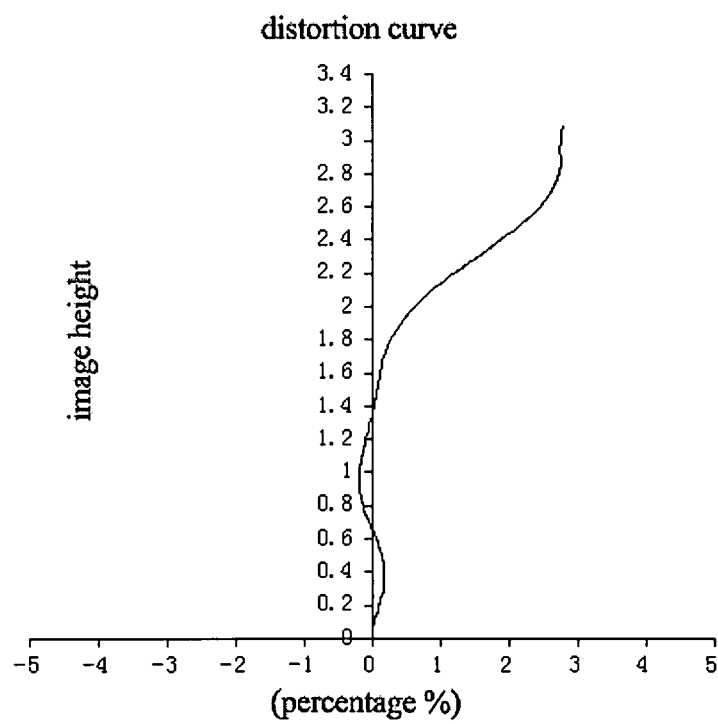
FIG. 24 is a diagram showing a distortion curve (%) of the camera lens assembly in Example 5.
Figure 25:
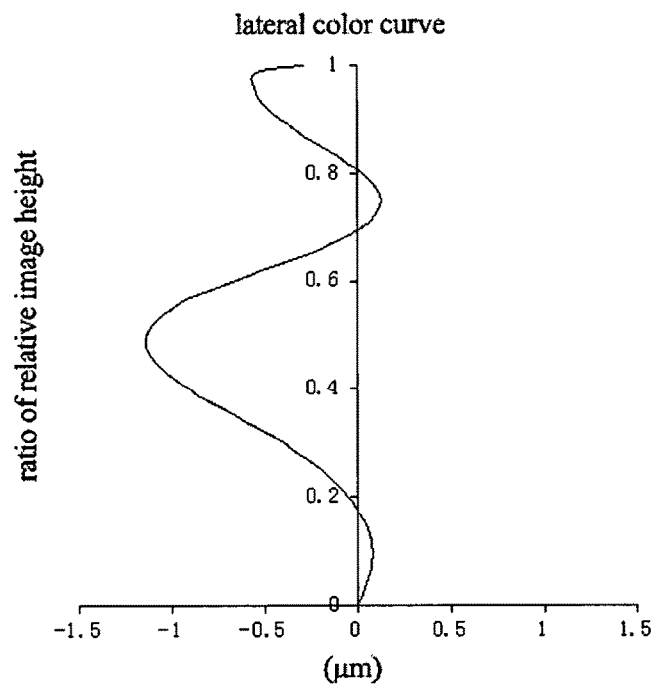
FIG. 25 is a diagram showing a lateral color curve (μm) of the camera lens assembly in Example 5.

With reference to FIG. 21, in example 5, the camera lens assembly meets the conditions in the following tables:

TABLE 9

| Surface No. | Surface type | Curvature radius | Thickness | refractive index/abbe | Conic coefficient |
|---|---|---|---|---|---|
| obj | spherical | infinity | infinity | | 0.0000 |
| STO | spherical | infinity | −0.1518 | | 0.0000 |
| S1 | aspheric | 1.0250 | 0.4542 | 1.5, 81.6 | −1.2668 |
| S2 | aspheric | 2.6841 | 0.2029 | | −24.6084 |
| S3 | aspheric | −116.1146 | 0.2181 | 1.54, 56.1 | −99.1200 |
| S4 | aspheric | 197.3175 | 0.2676 | | −85.3600 |
| S5 | aspheric | −113.2418 | 0.2304 | 1.64, 23.5 | −100.0000 |
| S6 | aspheric | 4.7083 | 0.2990 | | −1.6781 |
| S7 | aspheric | 3.0829 | 0.6616 | 1.54, 56.1 | −3.1864 |
| S8 | aspheric | −1.1511 | 0.2625 | | −7.5114 |
| S9 | aspheric | −0.7493 | 0.2400 | 1.54, 56.1 | −1.1704 |
| S10 | aspheric | 69.5470 | 0.2053 | | 156.8206 |
| S11 | spherical | infinity | 0.2100 | 1.52, 64.2 | 0.0000 |
| S12 | spherical | infinity | 0.3514 | | 0.0000 |
| S13 | spherical | infinity | | | 0.0000 |

TABLE 10

| Surface No. | A4 | A6 | A8 | A10 | A12 | A14 | A16 |
|---|---|---|---|---|---|---|---|
| S1 | 9.7462E−02 | 1.0082E+00 | −7.7237E+00 | 3.8790E+01 | −1.1034E+02 | 1.6383E+02 | −9.6982E+01 |
| S2 | 1.8084E−01 | −3.3116E−01 | −7.8112E−01 | 7.2805E+00 | −2.6902E+01 | 4.0614E+01 | −1.7204E+01 |
| S3 | −2.9087E−01 | 1.3198E+00 | −1.4321E+01 | 7.5033E+01 | −2.2519E+02 | 3.3499E+02 | −1.6766E+02 |
| S4 | −2.0392E−01 | −6.6358E−01 | 8.5880E+00 | −5.3153E+01 | 1.7444E+02 | −2.9414E+02 | 2.0957E+02 |
| S5 | −6.8442E−01 | 5.4893E−01 | 5.7538E−01 | −1.1135E+01 | 3.6267E+01 | −5.3232E+01 | 2.8651E+01 |
| S6 | −6.7776E−01 | 9.9467E−01 | −1.8899E+00 | 2.4717E+00 | −1.5766E+00 | 4.3798E−01 | −4.7918E−02 |
| S7 | −2.1781E−01 | 2.1654E−01 | −2.7748E−01 | 1.4636E−01 | −1.8613E−02 | −6.2067E−03 | 1.3508E−03 |
| S8 | −3.9383E−01 | 7.2158E−01 | −6.5083E−01 | 3.2096E−01 | −8.8510E−02 | 1.2707E−02 | −7.3672E−04 |
| S9 | 2.2116E−01 | −5.2890E−02 | 6.0788E−03 | −3.4520E−04 | 8.6718E−06 | 2.8030E−08 | 2.0577E−08 |
| S10 | 1.8798E−02 | −2.6606E−02 | 6.3884E−03 | −6.3538E−04 | 2.5139E−05 | −9.8651E−07 | −5.5395E−08 |

Furthermore, f1=3.05 mm; f2=−133.86 mm; f3=−7.0 mm; f4=1.62 mm; f5=−1.36 mm; f=3.06 mm; HFOV=43.7°; TTL=3.6 mm; Fno: 2.4.

Example 6

Figure 26:
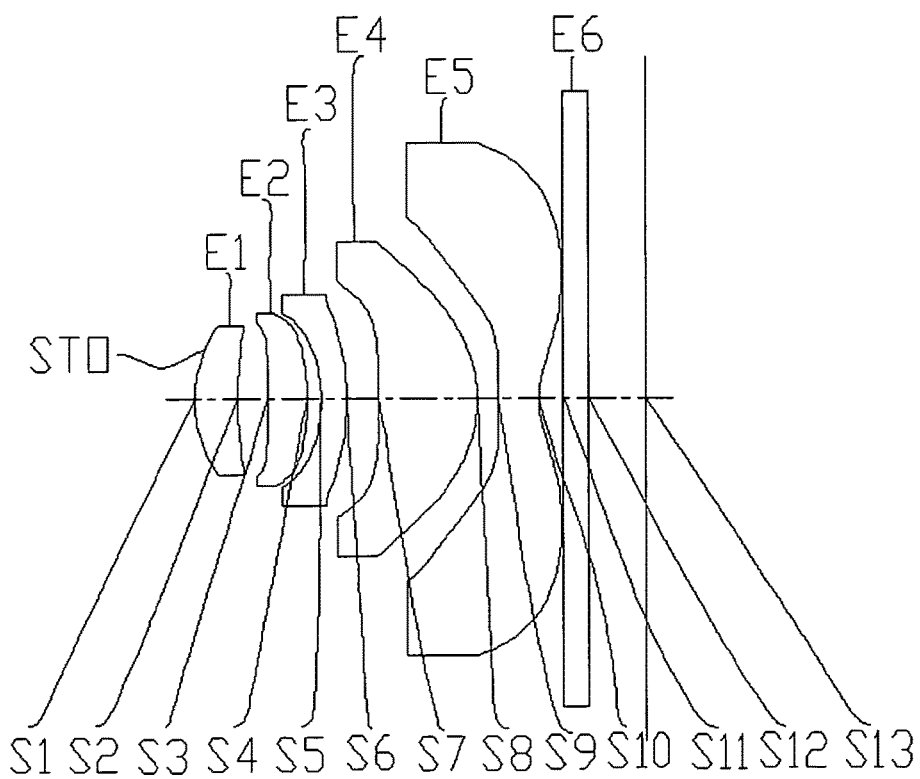
FIG. 26 is a schematic view showing the camera lens assembly according to Example 6 of the present disclosure.
Figure 27:
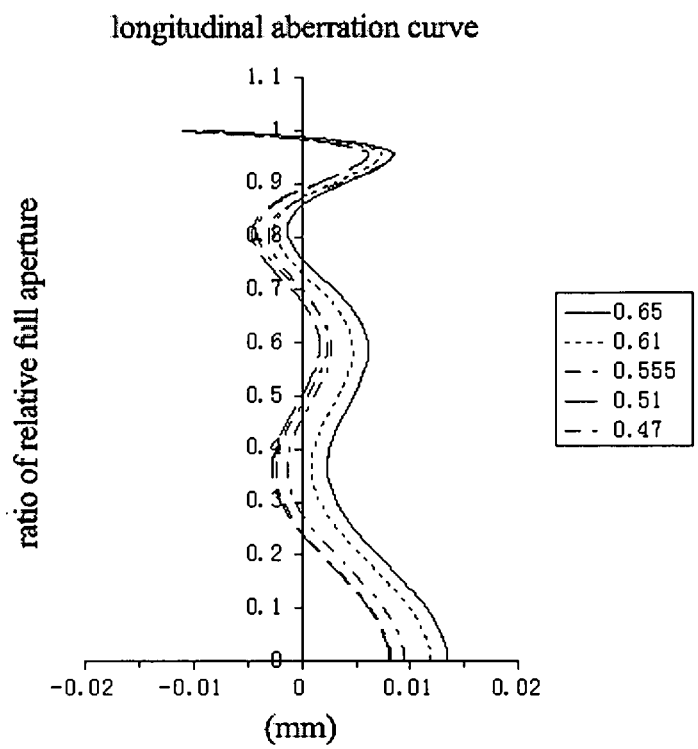
FIG. 27 is a diagram showing a longitudinal aberration curve (mm) of the camera lens assembly in Example 6.
Figure 28:
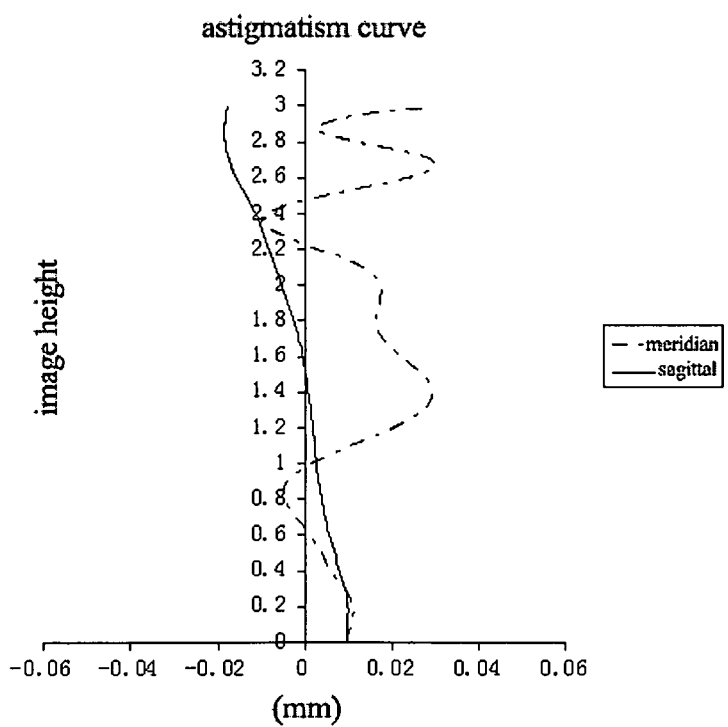
FIG. 28 is a diagram showing an astigmatism curve (mm) of the camera lens assembly in Example 6.
Figure 29:
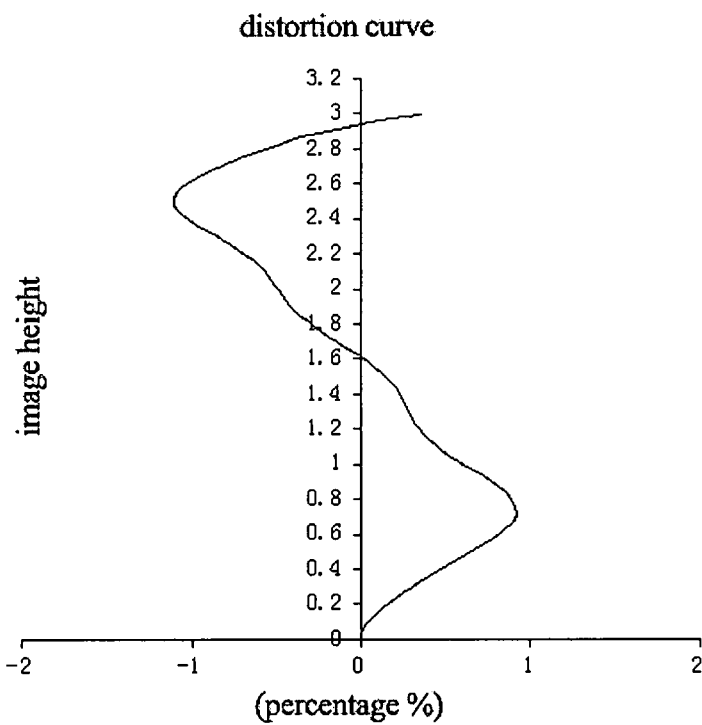
FIG. 29 is a diagram showing a distortion curve (%) of the camera lens assembly in Example 6.
Figure 30:
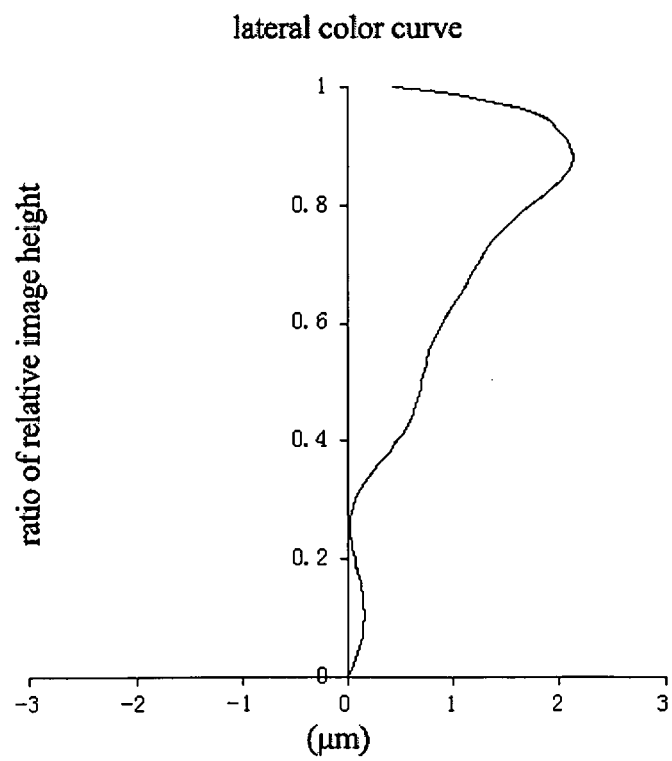
FIG. 30 is a diagram showing a lateral color curve (μm) of the camera lens assembly in Example 6.

With reference to FIG. 26, in example 6, the camera lens assembly meets the conditions in the following tables:

TABLE 11

| Surface No. | Surface type | Curvature radius | Thickness | refractive index/abbe | Conic coefficient |
|---|---|---|---|---|---|
| obj | spherical | infinity | infinity | | 0.0000 |
| STO + S1 | aspheric | 1.1600 | 0.3694 | 1.5, 81.6 | −1.4637 |
| S2 | aspheric | 3.4848 | 0.2632 | | −1.9582 |
| S3 | aspheric | −13.0998 | 0.3324 | 1.54, 56.1 | −765.6195 |
| S4 | aspheric | −2.4528 | 0.1186 | | −12.6619 |
| S5 | aspheric | −1.4621 | 0.2207 | 1.64, 23.5 | −1.4541 |
| S6 | aspheric | −3.0542 | 0.2765 | | −4.7413 |
| S7 | aspheric | −15.7758 | 0.8514 | 1.54, 56.1 | −12.2202 |
| S8 | aspheric | −1.1523 | 0.1793 | | −1.6138 |
| S9 | aspheric | 4.5206 | 0.3473 | 1.54, 56.1 | −247.1199 |
| S10 | aspheric | 0.7353 | 0.2100 | | −4.8332 |
| S11 | spherical | infinity | 0.2100 | 1.52, 64.2 | 0.0000 |
| S12 | spherical | infinity | 0.5000 | | 0.0000 |
| S13 | spherical | infinity | | | 0.0000 |

TABLE 12

| Surface No. | A4 | A6 | A8 | A10 | A12 | A14 | A16 |
|---|---|---|---|---|---|---|---|
| S1 | 1.4444E−01 | 2.8303E−02 | 1.5099E−01 | −5.3288E−02 | −2.1196E+00 | 7.1098E+00 | −7.9509E+00 |
| S2 | 4.4079E−02 | −4.0336E−01 | 2.7093E+00 | −1.1080E+01 | 1.9302E+01 | −8.7128E+00 | −1.3731E+01 |
| S3 | −7.4643E−02 | −1.3870E+00 | 8.8838E+00 | −3.2297E+01 | 4.2932E+01 | 2.0387E+01 | −8.6639E+01 |
| S4 | −2.6888E−01 | 2.2388E−01 | −1.4780E+00 | 2.2985E+00 | −2.0891E+00 | −5.9371E+00 | 5.6348E+00 |
| S5 | −3.6912E−01 | 9.6711E−01 | −2.6027E+00 | 3.4929E+00 | −6.5408E+00 | 5.4324E+00 | −1.3152E+00 |
| S6 | −3.0348E−01 | 6.4859E−01 | −1.0067E+00 | 1.0233E+00 | −1.3629E+00 | 1.6177E+00 | −5.9749E−01 |
| S7 | −1.5544E−01 | −3.2089E−01 | 1.2261E+00 | −3.2918E+00 | 5.0663E+00 | −4.2456E+00 | 1.4446E+00 |
| S8 | −9.8909E−03 | −1.5896E−01 | 1.4333E−01 | −5.3794E−02 | 4.9543E−03 | 7.3177E−03 | −2.8283E−03 |
| S9 | −7.7943E−01 | 6.8063E−01 | −3.1067E−01 | 8.4727E−02 | −1.3845E−02 | 1.3193E−03 | −1.2064E−04 |
| S10 | −3.4877E−01 | 3.2328E−01 | −1.8556E−01 | 6.5793E−02 | −1.4104E−02 | 1.6665E−03 | −8.3507E−05 |

Furthermore, f1=3.32 mm; f2=5.47 mm; f3=−4.6 mm; f4=2.23 mm; f5=−1.66 mm; f=3.13 mm; HFOV=43.8°; TTL=3.88 mm; Fno: 2.4.

Example 7

Figure 31:
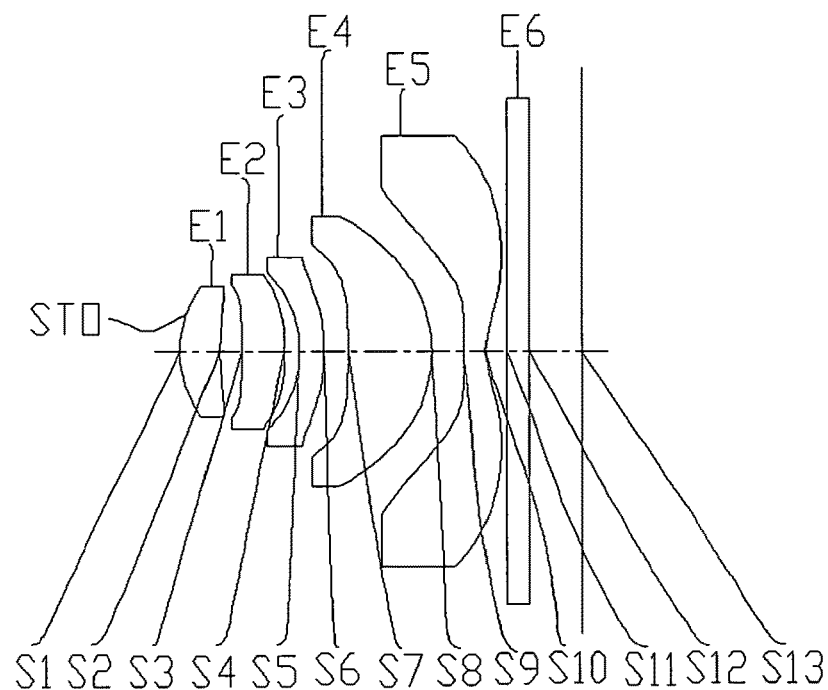
FIG. 31 is a schematic view showing the camera lens assembly according to Example 7 of the present disclosure.
Figure 32:
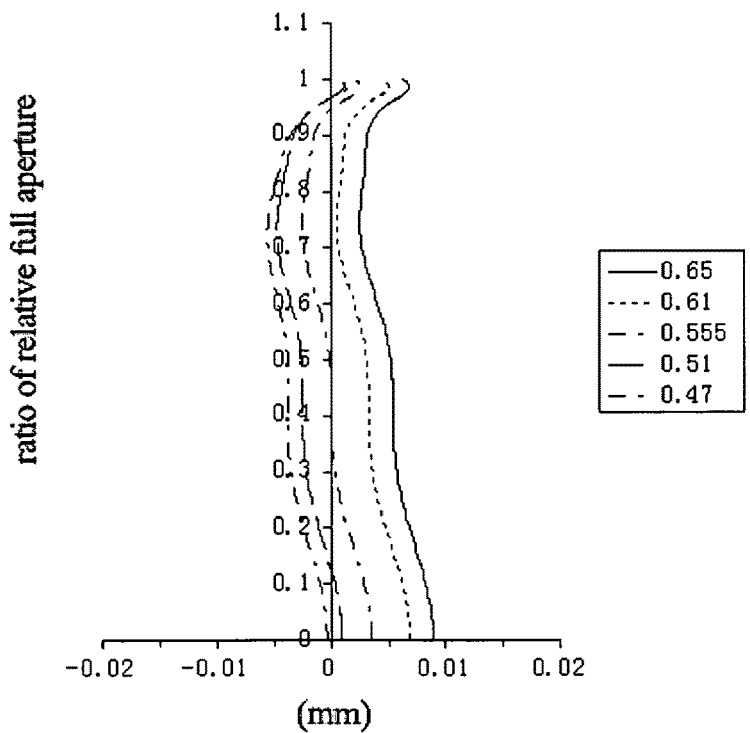
FIG. 32 is a diagram showing a longitudinal aberration curve (mm) of the camera lens assembly in Example 7.
Figure 33:
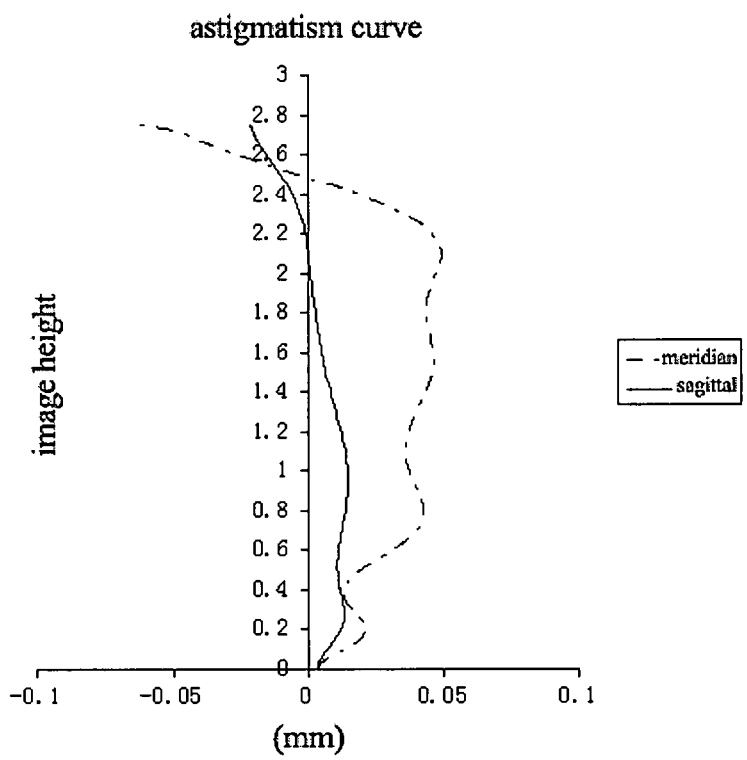
FIG. 33 is a diagram showing an astigmatism curve (mm) of the camera lens assembly in Example 7.
Figure 34:
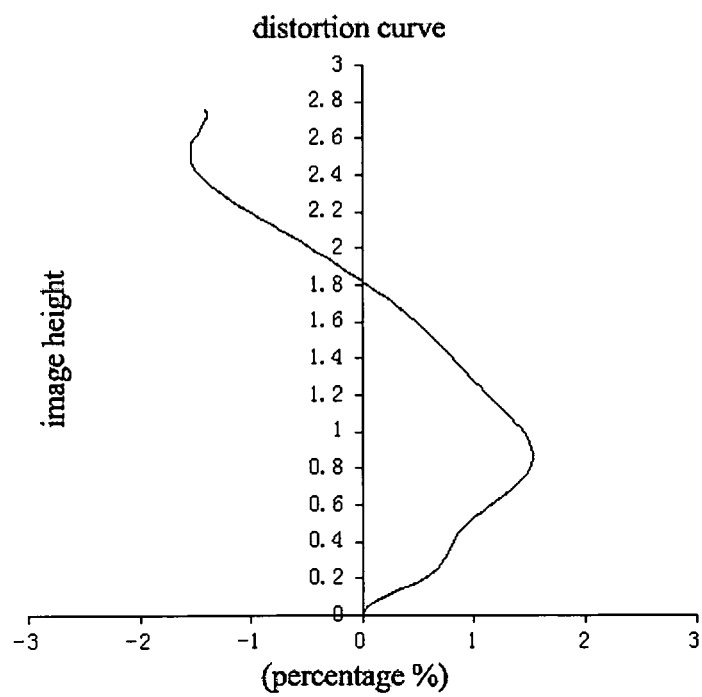
FIG. 34 is a diagram showing a distortion curve (%) of the camera lens assembly in Example 7.
Figure 35:
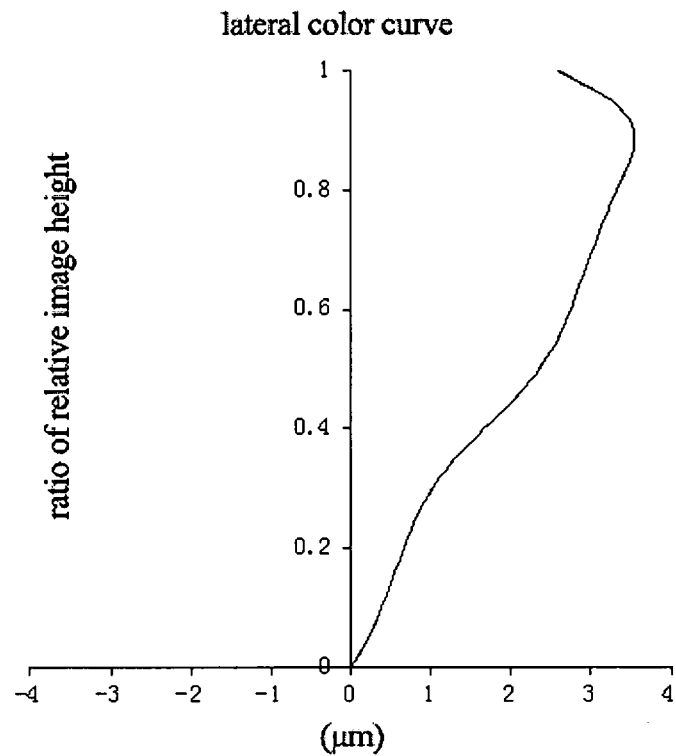
FIG. 35 is a diagram showing a lateral color curve (m) of the camera lens assembly in Example 7.

With reference to FIG. 31, in example 7, the camera lens assembly meets the conditions in the following tables:

TABLE 13

| Surface No. | Surface type | Curvature radius | Thickness | refractive index/abbe | Conic coefficient |
|---|---|---|---|---|---|
| obj | spherical | infinity | infinity | | 0.0000 |
| STO + S1 | aspheric | 1.1436 | 0.3745 | 1.5, 81.6 | −1.2638 |
| S2 | aspheric | 3.3691 | 0.2100 | | −4.4883 |
| S3 | aspheric | −6.6392 | 0.4107 | 1.54, 56.1 | −14.5156 |
| S4 | aspheric | −2.1591 | 0.1452 | | −21.0165 |
| S5 | aspheric | −1.2600 | 0.2396 | 1.64, 23.5 | −1.2194 |
| S6 | aspheric | −2.2060 | 0.2291 | | −3.7836 |
| S7 | aspheric | −17.4637 | 0.8137 | 1.54, 56.1 | 283.8064 |
| S8 | aspheric | −1.2383 | 0.2990 | | −3.0058 |
| S9 | aspheric | 2.8243 | 0.2151 | 1.54, 56.1 | −213.8123 |
| S10 | aspheric | 0.7236 | 0.2020 | | −6.5154 |
| S11 | spherical | infinity | 0.2100 | 1.52, 64.2 | 0.0000 |
| S12 | spherical | infinity | 0.5097 | | 0.0000 |
| S13 | spherical | infinity | | | 0.0000 |

TABLE 14

| Surface No. | A4 | A6 | A8 | A10 | A12 | A14 | A16 |
|---|---|---|---|---|---|---|---|
| S1 | 1.5152E−01 | 7.9865E−02 | −3.2810E−03 | −4.2139E−01 | −9.7246E−01 | 1.3018E+01 | −2.0351E+01 |
| S2 | 4.9270E−02 | −3.4670E−01 | 2.5343E+00 | −1.1709E+01 | 1.9914E+01 | −9.1240E−01 | −3.4259E+01 |
| S3 | −7.2034E−02 | −1.3100E+00 | 8.6111E+00 | −3.3999E+01 | 4.6487E+01 | 2.7880E+01 | −1.0201E+02 |
| S4 | −3.6831E−01 | 2.4541E−01 | −1.1274E+00 | 2.3862E+00 | −2.9009E+00 | −6.4539E+00 | 1.5447E+01 |
| S5 | −3.6494E−01 | 9.7843E−01 | −2.8874E+00 | 3.5786E+00 | −4.6788E+00 | 7.3372E+00 | −2.2880E+00 |
| S6 | −3.2166E−01 | 6.2958E−01 | −9.6993E−01 | 1.1019E+00 | −1.2970E+00 | 1.6202E+00 | −7.2142E−01 |
| S7 | −1.5494E−01 | −3.3738E−01 | 1.2266E+00 | −3.2601E+00 | 5.0588E+00 | −4.1832E+00 | 1.3911E+00 |
| S8 | −4.8505E−02 | −1.8908E−01 | 1.4891E−01 | −4.9689E−02 | 4.2559E−03 | 6.3776E−03 | −3.2073E−03 |
| S9 | −8.1646E−01 | 6.8353E−01 | −3.0577E−01 | 8.4554E−02 | −1.4547E−02 | 1.4518E−03 | −6.6509E−05 |
| S10 | −3.6266E−01 | 3.2895E−01 | −1.8410E−01 | 6.4921E−02 | −1.4190E−02 | 1.7459E−03 | −9.1822E−05 |

Furthermore, f1=3.29 mm; f2=5.68 mm; f3=−5.1 mm; f4=2.4 mm; f5=−1.85 mm; f=3.04 mm; HFOV=42.6°; TTL=3.86 mm; Fno: 2.4.

Example 8

Figure 36:
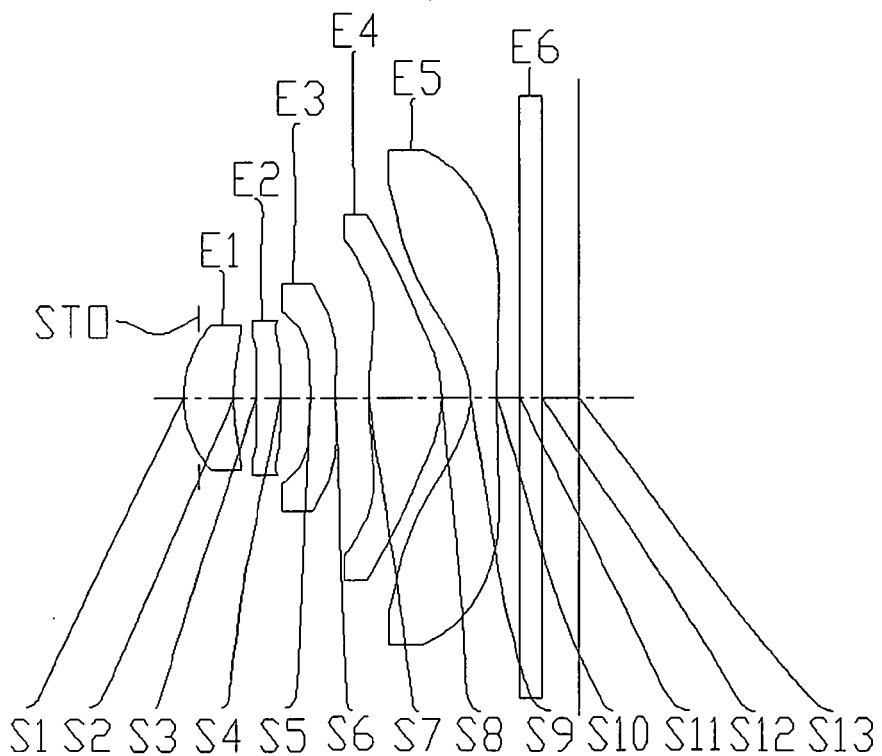
FIG. 36 is a schematic view showing the camera lens assembly according to Example 8 of the present disclosure.
Figure 37:
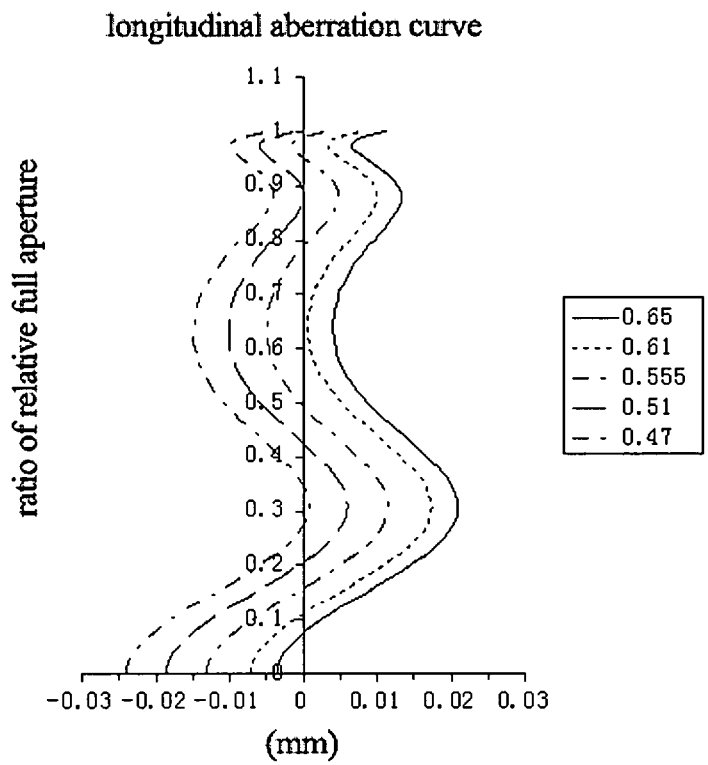
FIG. 37 is a diagram showing a longitudinal aberration curve (mm) of the camera lens assembly in Example 8.
Figure 38:
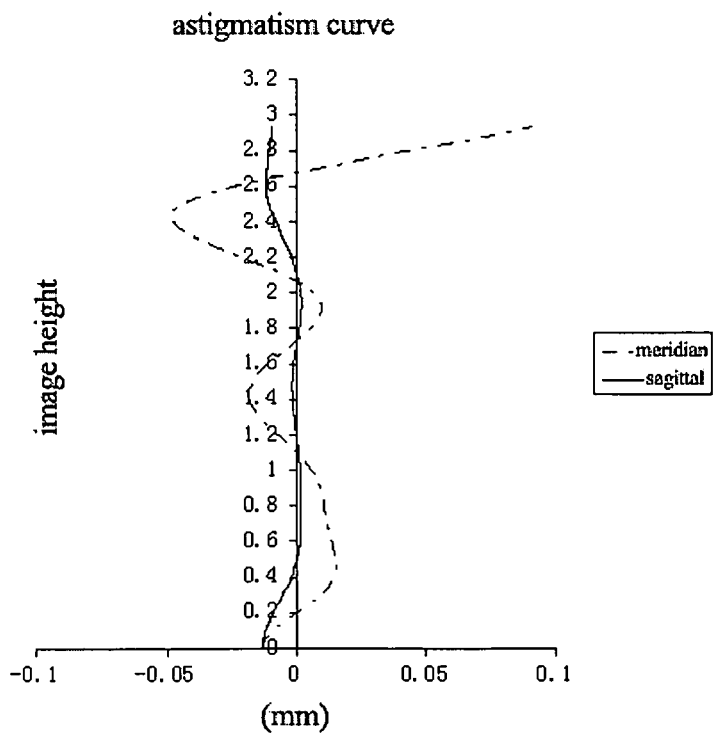
FIG. 38 is a diagram showing an astigmatism curve (mm) of the camera lens assembly in Example 8.
Figure 39:
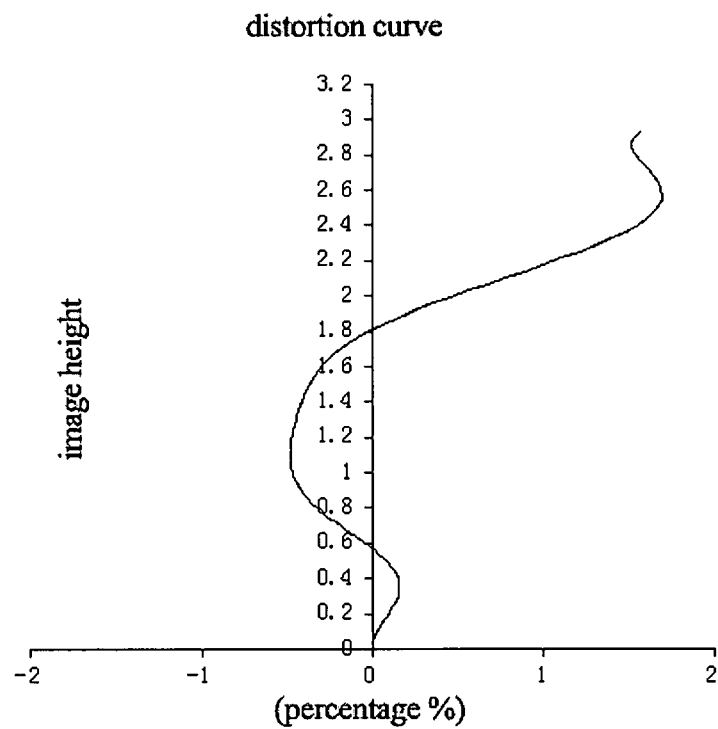
FIG. 39 is a diagram showing a distortion curve (%) of the camera lens assembly in Example 8.
Figure 40:
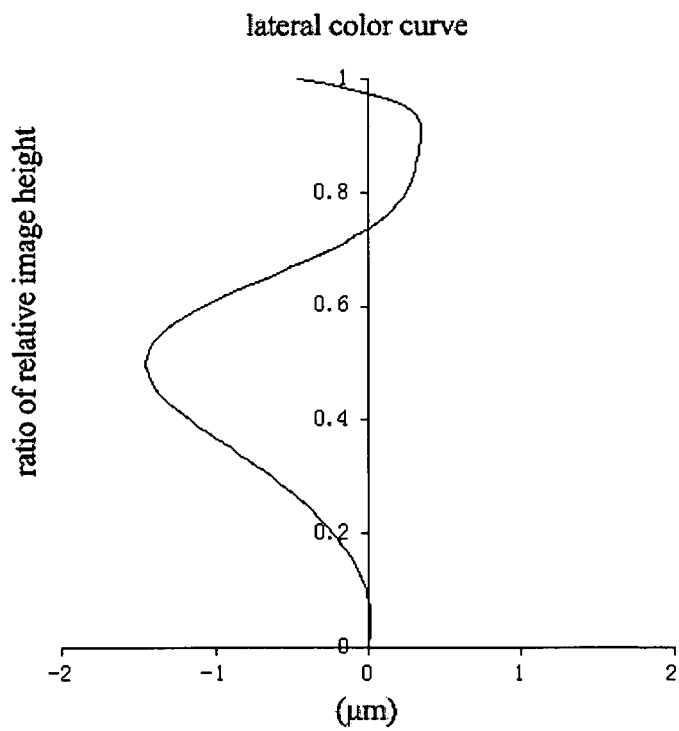
FIG. 40 is a diagram showing a lateral color curve (μm) of the camera lens assembly in Example 8.

With reference to FIG. 36, in example 8, the camera lens assembly meets the conditions in the following tables:

TABLE 15

| Surface No. | Surface type | Curvature radius | Thickness | refractive index/abbe | Conic coefficient |
|---|---|---|---|---|---|
| obj | spherical | infinity | infinity | | 0.0000 |
| STO | spherical | infinity | −0.1416 | | 0.0000 |
| S1 | aspheric | 1.0364 | 0.4542 | 1.5, 81.6 | −1.2560 |
| S2 | aspheric | 2.4796 | 0.2029 | | −25.2247 |
| S3 | aspheric | 1680.9108 | 0.2181 | 1.54, 56.1 | −23.2158 |
| S4 | aspheric | −20.8185 | 0.2676 | | 135.2716 |
| S5 | aspheric | 149.9723 | 0.2304 | 1.64, 23.5 | 10497.0708 |
| S6 | aspheric | 3.5730 | 0.2990 | | −7.2560 |
| S7 | aspheric | 2.7603 | 0.6616 | 1.54, 56.1 | −2.5740 |
| S8 | aspheric | −1.1323 | 0.2625 | | −7.4399 |
| S9 | aspheric | −0.7700 | 0.2400 | 1.54, 56.1 | −1.1887 |
| S10 | aspheric | 13.0166 | 0.2053 | | −789.1518 |
| S11 | spherical | infinity | 0.2100 | 1.52, 64.2 | 0.0000 |
| S12 | spherical | infinity | 0.3336 | | 0.0000 |
| S13 | spherical | infinity | | | 0.0000 |

TABLE 16

| Surface No. | A4 | A6 | A8 | A10 | A12 | A14 | A16 |
|---|---|---|---|---|---|---|---|
| S1 | 9.7464E−02 | 9.7213E−01 | −7.7623E+00 | 3.8820E+01 | −1.1015E+02 | 1.6396E+02 | −9.8998E+01 |
| S2 | 1.8914E−01 | −3.0115E−01 | −8.4802E−01 | 6.8059E+00 | −2.8282E+01 | 3.9061E+01 | −7.8052E+00 |
| S3 | −2.6939E−01 | 1.2497E+00 | −1.4561E+01 | 7.4880E+01 | −2.2395E+02 | 3.3855E+02 | −1.8204E+02 |
| S4 | −2.0380E−01 | −7.0164E−01 | 8.5127E+00 | −5.3167E+01 | 1.7462E+02 | −2.9374E+02 | 2.1015E+02 |
| S5 | −6.9573E−01 | 4.8616E−01 | 6.0678E−01 | −1.1030E+01 | 3.6358E+01 | −5.3173E+01 | 2.8847E+01 |
| S6 | −6.9545E−01 | 1.0049E+00 | −1.8922E+00 | 2.4665E+00 | −1.5797E+00 | 4.3782E−01 | −4.5835E−02 |
| S7 | −2.2196E−01 | 2.2344E−01 | −2.7790E−01 | 1.4562E−01 | −1.8783E−02 | −6.1743E−03 | 1.4189E−03 |
| S8 | −3.8158E−01 | 7.2227E−01 | −6.5080E−01 | 3.2098E−01 | −8.8488E−02 | 1.2715E−02 | −7.3509E−04 |
| S9 | 2.2003E−01 | −5.3499E−02 | 5.9791E−03 | −3.5533E−04 | 8.7837E−06 | 4.9591E−07 | 1.9914E−07 |
| S10 | 1.6302E−02 | −2.5234E−02 | 6.3645E−03 | −6.6904E−04 | 2.1401E−05 | −1.1554E−06 | −4.9321E−08 |

Furthermore, f1=3.24 mm; f2=37.67 mm; f3=−5.68 mm; f4=1.56 mm; f5=−1.32 mm; f=3.07 mm; HFOV=43.1°; TTL=3.59 mm; Fno: 2.4.

Example 9

Figure 41:
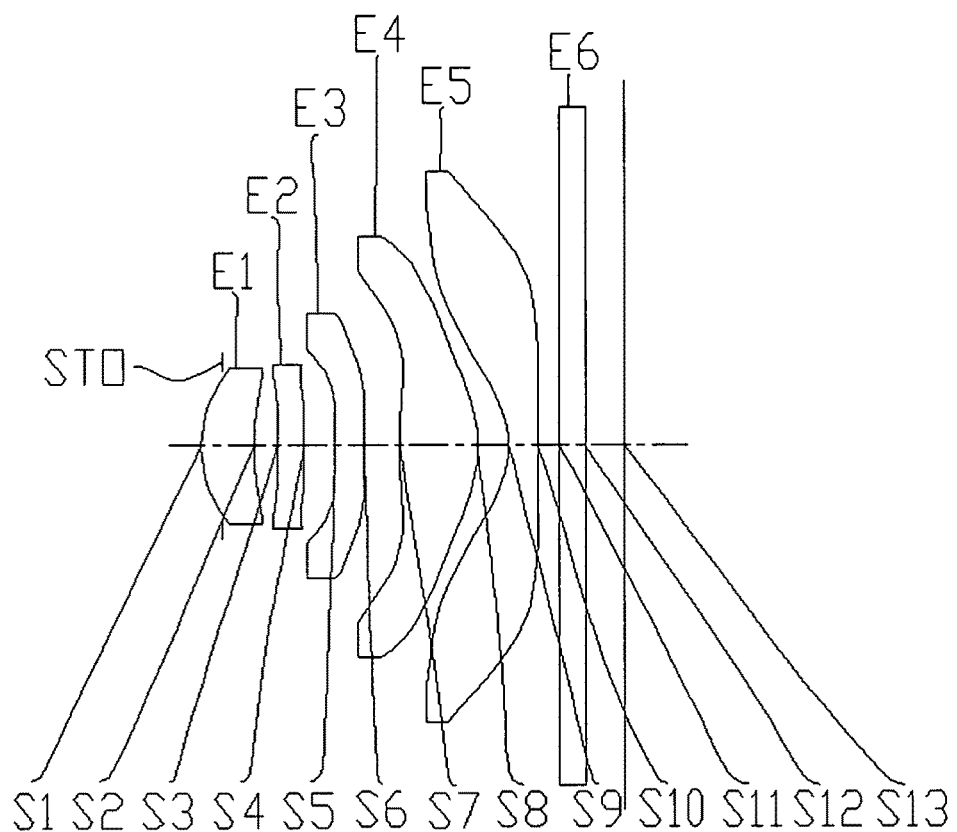
FIG. 41 is a schematic view showing the camera lens assembly according to Example 9 of the present disclosure.
Figure 42:
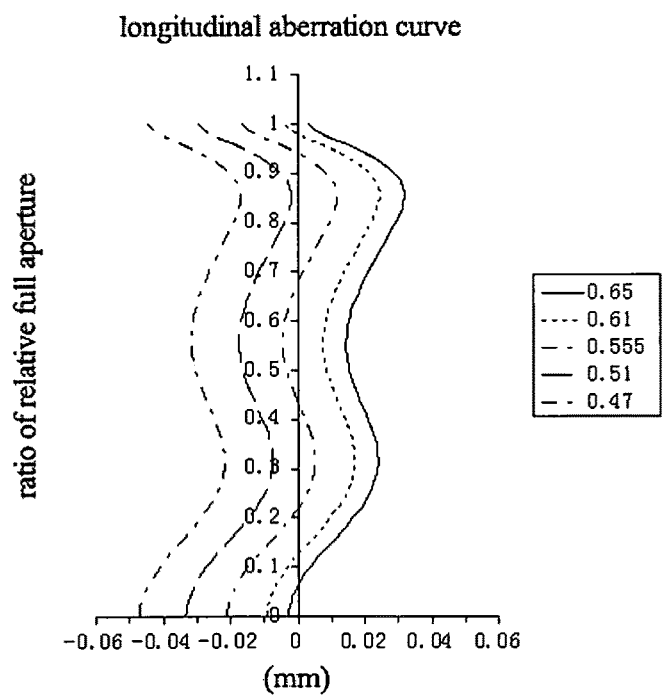
FIG. 42 is a diagram showing a longitudinal aberration curve (mm) of the camera lens assembly in Example 9.
Figure 43:
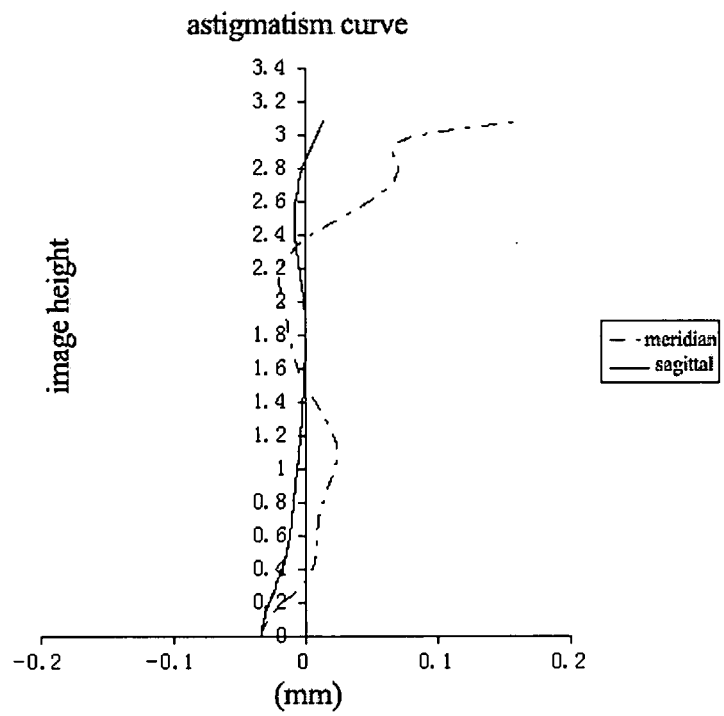
FIG. 43 is a diagram showing an astigmatism curve (mm) of the camera lens assembly in Example 9.
Figure 44:
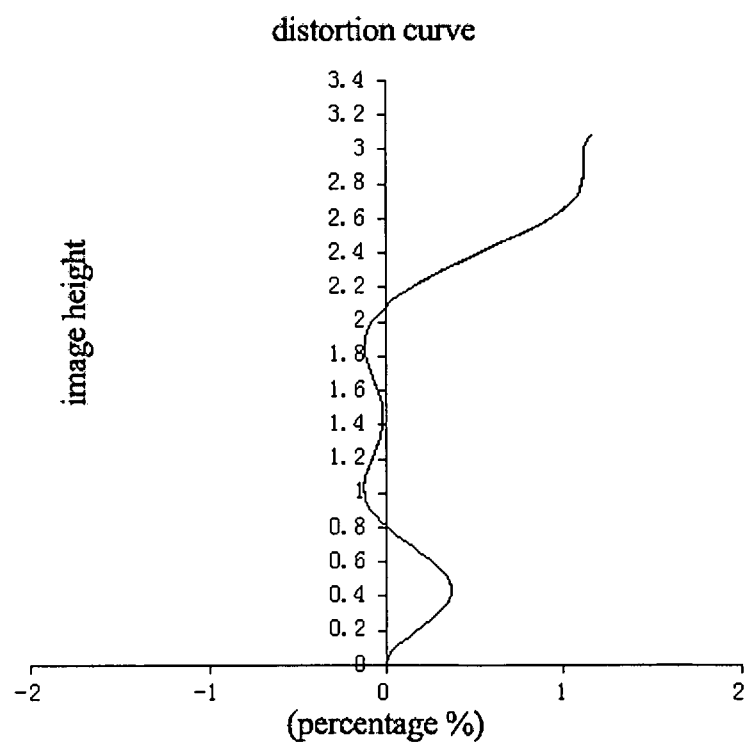
FIG. 44 is a diagram showing a distortion curve (%) of the camera lens assembly in Example 9.
Figure 45:
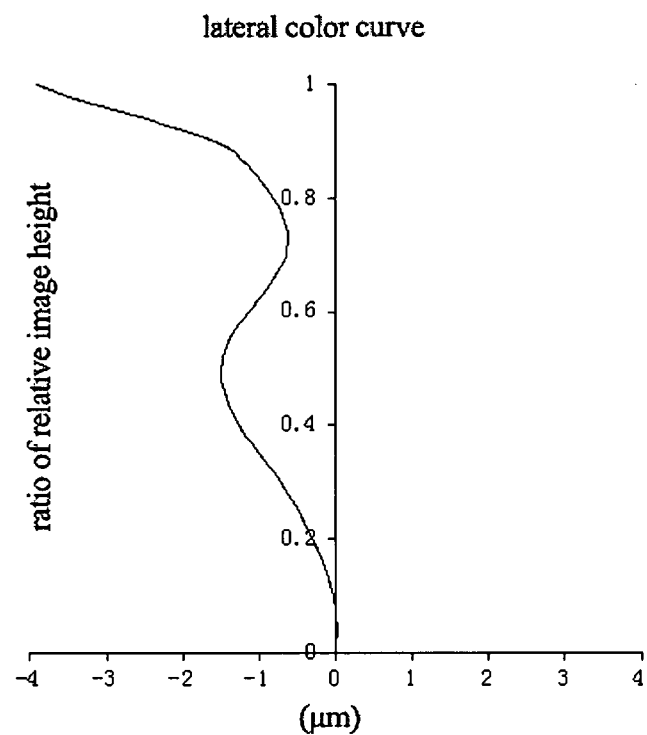
FIG. 45 is a diagram showing a lateral color curve (μm) of the camera lens assembly in Example 9.

With reference to FIG. 41, in example 9, the camera lens assembly meets the conditions in the following tables:

TABLE 17

| Surface No. | Surface type | Curvature radius | Thickness | refractive index/abbe | Conic coefficient |
|---|---|---|---|---|---|
| obj | spherical | infinity | infinity | | 0.0000 |
| STO | spherical | infinity | −0.1802 | | |
| S1 | aspheric | 1.0528 | 0.4445 | 1.53, 55.9 | −1.2594 |
| S2 | aspheric | 2.3783 | 0.1986 | | −23.0258 |
| S3 | aspheric | −395.9684 | 0.2199 | 1.54, 56.1 | 97.4473 |
| S4 | aspheric | −21.0883 | 0.2628 | | 164.8979 |
| S5 | aspheric | −141.3412 | 0.2414 | 1.64, 23.5 | −86.3703 |
| S6 | aspheric | 5.4324 | 0.2944 | | 4.2096 |
| S7 | aspheric | 3.5794 | 0.6542 | 1.54, 56.1 | −5.864 |
| S8 | aspheric | −1.2754 | 0.2600 | | −10.6692 |
| S9 | aspheric | −0.7910 | 0.2422 | 1.54, 56.1 | −1.1544 |
| S10 | aspheric | −2129.6477 | 0.1890 | | −83.8496 |
| S11 | spherical | infinity | 0.2100 | 1.52, 64.2 | 0.0000 |
| S12 | spherical | infinity | 0.3333 | | 0.0000 |
| S13 | spherical | infinity | | | 0.0000 |

TABLE 18

| Surface No. | A4 | A6 | A8 | A10 | A12 | A14 | A16 |
|---|---|---|---|---|---|---|---|
| S1 | 1.0004E−01 | 9.5026E−01 | −7.7991E+00 | 3.8870E+01 | −1.0987E+02 | 1.6434E+02 | −1.0102E+02 |
| S2 | 1.9437E−01 | −3.0378E−01 | −8.1276E−01 | 7.0244E+00 | −2.7642E+01 | 3.9638E+01 | −1.3109E+01 |
| S3 | −2.7912E−01 | 1.2868E+00 | −1.4390E+01 | 7.5322E+01 | −2.2306E+02 | 3.3893E+02 | −1.8368E+02 |
| S4 | −2.0303E−01 | −6.7207E−01 | 8.7067E+00 | −5.2996E+01 | 1.7468E+02 | −2.9375E+02 | 2.1071E+02 |
| S5 | −6.4695E−01 | 5.7521E−01 | 5.9838E−01 | −1.1169E+01 | 3.6162E+01 | −5.3075E+01 | 3.0083E+01 |
| S6 | −6.4195E−01 | 1.0002E+00 | −1.9130E+00 | 2.4726E+00 | −1.5747E+00 | 4.3981E−01 | −4.4262E−02 |
| S7 | −2.2797E−01 | 2.1419E−01 | −2.7544E−01 | 1.4713E−01 | −1.8368E−02 | −6.1964E−03 | 1.3254E−03 |
| S8 | −3.9375E−01 | 7.2906E−01 | −6.5120E−01 | 3.2069E−01 | −8.8561E−02 | 1.2699E−02 | −7.3236E−04 |
| S9 | 2.2101E−01 | −5.2639E−02 | 6.1305E−03 | −3.4212E−04 | 8.5771E−06 | −7.5264E−09 | 8.5296E−09 |
| S10 | 1.3042E−02 | −2.7313E−02 | 6.3772E−03 | −6.2344E−04 | 2.7873E−05 | −5.2283E−07 | 2.6970E−08 |

Furthermore, f1=3.18 mm; f2=40.79 mm; f3=−8.11 mm; f4=1.81 mm; f5=−1.45 mm; f=3.06 mm; HFOV=44.6°; TTL=3.55 mm; Fno: 2.4.

Example 10

Figure 46:
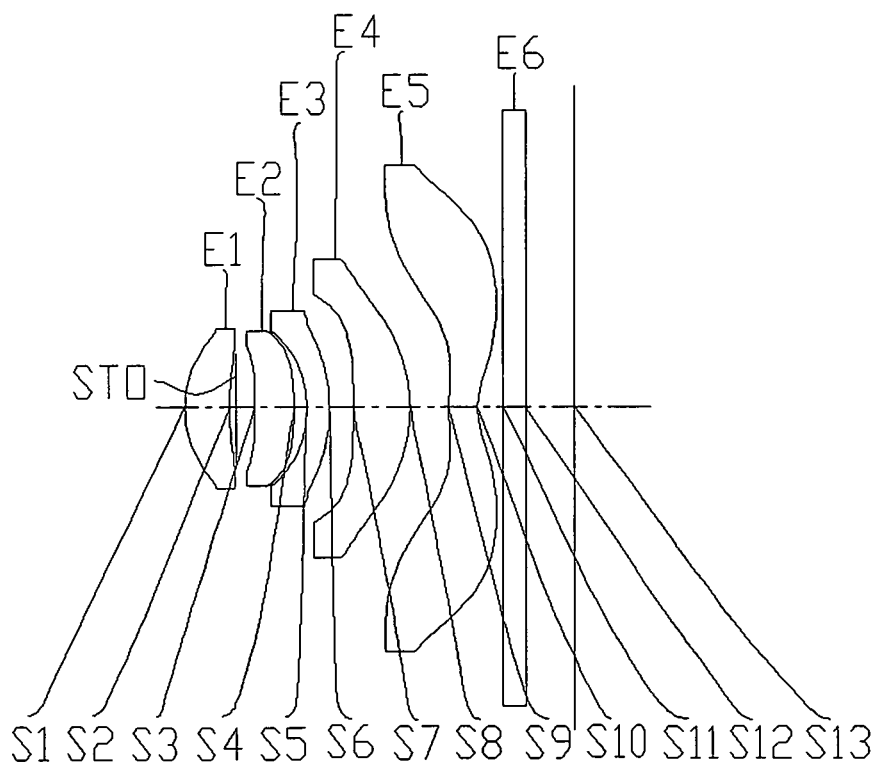
FIG. 46 is a schematic view showing the camera lens assembly according to Example 10 of the present disclosure.
Figure 47:
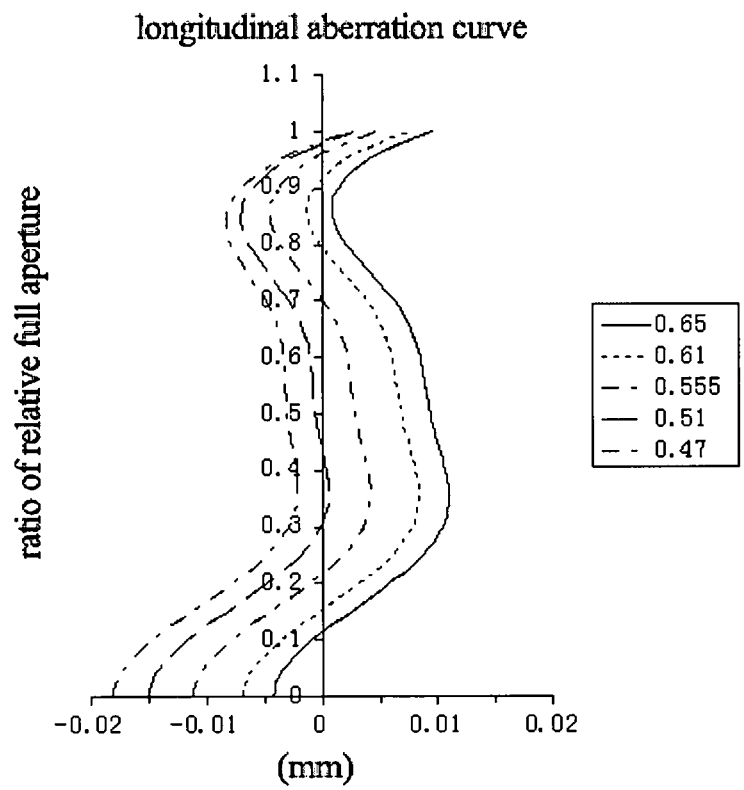
FIG. 47 is a diagram showing a longitudinal aberration curve (mm) of the camera lens assembly in Example 10.
Figure 48:
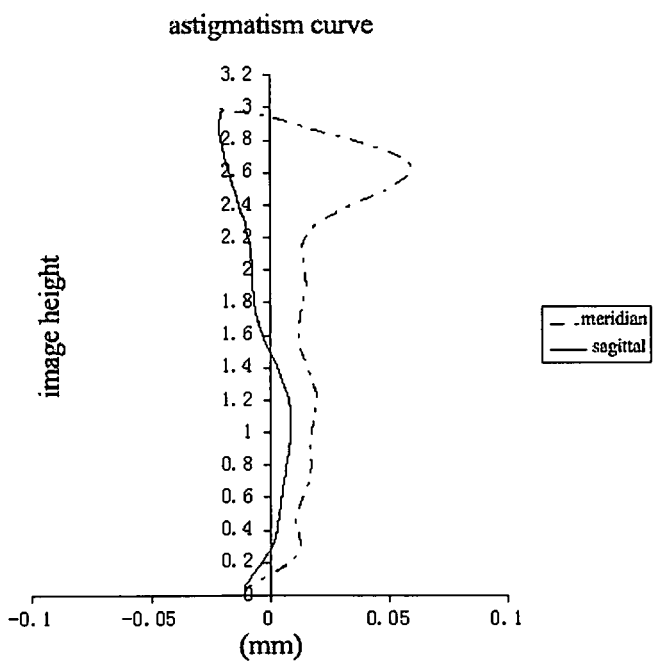
FIG. 48 is a diagram showing an astigmatism curve (mm) of the camera lens assembly in Example 10.
Figure 49:
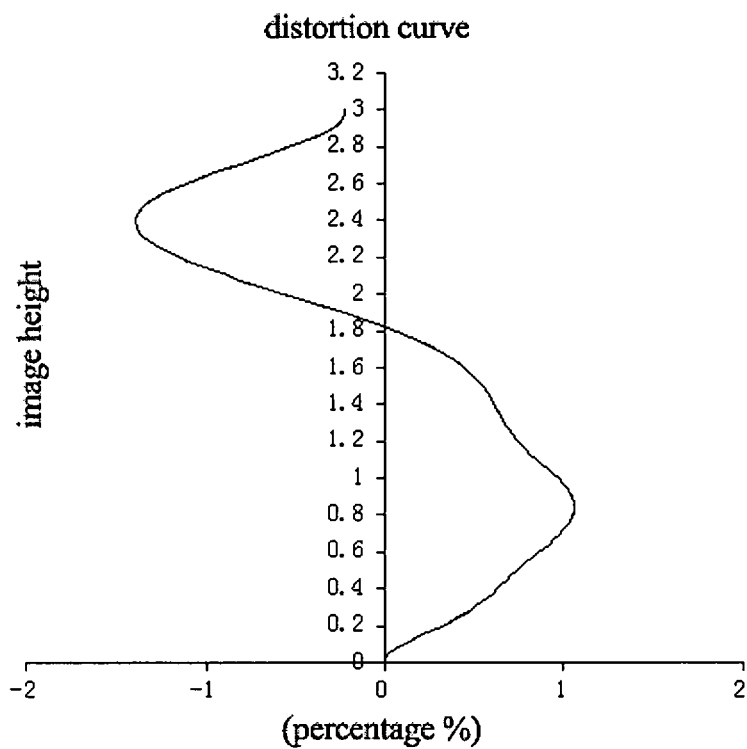
FIG. 49 is a diagram showing a distortion curve (%) of the camera lens assembly in Example 10.
Figure 50:
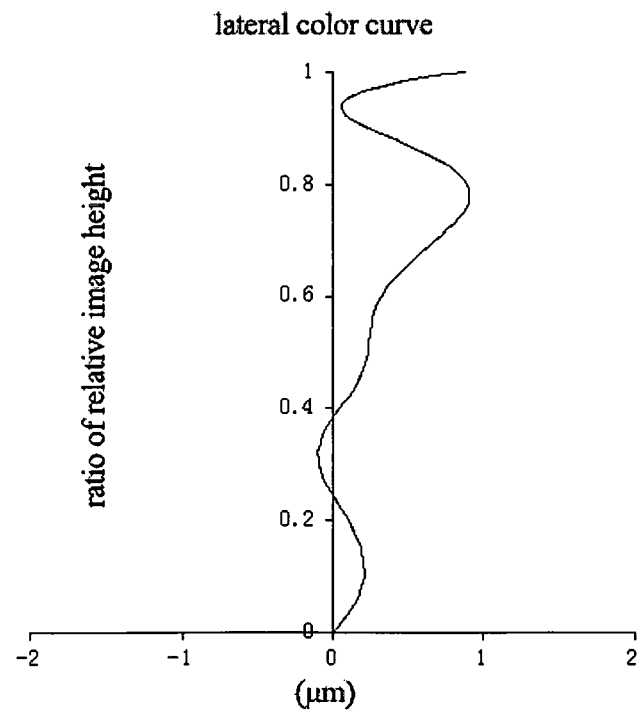
FIG. 50 is a diagram showing a lateral color curve (μm) of the camera lens assembly in Example 10.

With reference to FIG. 46, in example 10, the camera lens assembly meets the conditions in the following tables:

TABLE 19

| Surface No. | Surface type | Curvature radius | Thickness | refractive index/abbe | Conic coefficient |
|---|---|---|---|---|---|
| obj | spherical | infinity | infinity | | 0.0000 |
| S1 | aspheric | 1.0727 | 0.4096 | 1.5, 81.6 | −1.2682 |
| S2 | aspheric | 3.1549 | 0.0596 | | −3.9626 |
| STO | spherical | infinity | 0.1676 | | 0.0000 |
| S3 | aspheric | −6.7561 | 0.3639 | 1.54, 56.1 | 19.5561 |
| S4 | aspheric | −2.3817 | 0.1138 | | −13.3230 |
| S5 | aspheric | −1.0651 | 0.2107 | 1.64, 23.5 | −0.8503 |
| S6 | aspheric | −1.6569 | 0.2161 | | −3.5955 |
| S7 | aspheric | −8.9549 | 0.5179 | 1.54, 56.1 | −9.0236 |
| S8 | aspheric | −1.3111 | 0.3506 | | −2.8775 |
| S9 | aspheric | 1.7889 | 0.2603 | 1.54, 56.1 | −59.1932 |
| S10 | aspheric | 0.6507 | 0.2376 | | −5.7080 |
| S11 | spherical | infinity | 0.2100 | 1.52, 64.2 | 0.0000 |
| S12 | spherical | infinity | 0.4363 | | 0.0000 |
| S13 | spherical | infinity | | | 0.0000 |

TABLE 20

| Surface No. | A4 | A6 | A8 | A10 | A12 | A14 | A16 |
|---|---|---|---|---|---|---|---|
| S1 | 1.3537E−01 | 6.7724E−01 | −6.6809E+00 | 4.2776E+01 | −1.4365E+02 | 2.4242E+02 | −1.6393E+02 |
| S2 | 2.3798E−02 | −9.3139E−03 | 4.4551E−02 | −4.0982E+00 | 1.2140E+01 | −2.6997E+01 | 8.1530E+00 |
| S3 | −2.0272E−01 | 1.5681E−01 | −7.1594E+00 | 3.9694E+01 | −1.2026E+02 | 1.6436E+02 | −1.4339E+02 |
| S4 | −3.5212E−01 | −9.2410E−01 | 1.1041E+01 | −6.7260E+01 | 2.0542E+02 | −3.3176E+02 | 2.1783E+02 |
| S5 | −4.7132E−01 | 2.64251E+00 | −1.5927E+01 | 6.8927E+01 | −1.8405E+02 | 2.5040E+02 | −1.3289E+02 |
| S6 | −3.2304E−01 | 9.1006E−01 | −2.8491E+00 | 8.3380E+00 | −1.4940E+01 | 1.3916E+01 | −5.0435E+00 |
| S7 | 3.8622E−02 | −9.7192E−01 | 2.8665E+00 | −5.8577E+00 | 7.3885E+00 | −5.1629E+00 | 1.4823E+00 |
| S8 | 5.7535E−02 | −2.8371E−01 | 1.8808E−01 | 6.8681E−02 | −1.2913E−01 | 5.7882E−02 | −9.5159E−03 |
| S9 | −6.8656E−01 | 5.6047E−01 | −2.3686E−01 | 6.2000E−02 | −1.0262E−02 | 9.9924E−04 | −4.4037E−05 |
| S10 | −3.3200E−01 | 2.7510E−01 | −1.4450E−01 | 4.7223E−02 | −9.5604E−03 | 1.0902E−03 | −5.2709E−05 |

Furthermore, f1=3.06 mm; f2=6.55 mm; f3=−5.38 mm; f4=2.75 mm; f5=−2.04 mm; f=2.86 mm; HFOV=46.3°; TTL=3.55 mm; Fno: 2.4.

In examples 1 to 10, formulas meet the conditions in the following tables:

| Formula Example | 1 | 2 | 3 | 4 | 5 | 6 | 7 | 8 | 9 | 10 |
|---|---|---|---|---|---|---|---|---|---|---|
| TTL/2Y | 0.58 | 0.58 | 0.58 | 0.58 | 0.58 | 0.65 | 0.7 | 0.61 | 0.58 | 0.59 |
| f/f3 | −0.48 | −0.4 | −0.43 | −0.41 | −0.44 | −0.68 | −0.6 | −0.54 | −0.38 | −0.53 |
| SAG42/SD42 | −0.48 | −0.44 | −0.46 | −0.43 | −0.5 | −0.64 | −0.69 | −0.4 | −0.45 | −0.46 |
| f1/f3 | −0.51 | −0.41 | −0.44 | −0.42 | −0.44 | −0.72 | −0.65 | −0.57 | −0.39 | −0.57 |
| V1−V3 | 58.1 | 58.1 | 58.1 | 58.1 | 58.1 | 58.1 | 58.1 | 58.1 | 32.4 | 58.1 |
| (R1 − R2)/(R1 + R2) | −0.47 | −0.42 | −0.45 | −0.42 | −0.45 | −0.5 | −0.49 | −0.41 | −0.39 | −0.49 |
| f/f4 | 0.97 | 1.7 | 1.82 | 1.7 | 1.88 | 1.4 | 1.27 | 1.96 | 1.69 | 1.04 |
| R6/R7 | 0.23 | 1.42 | 1.52 | 1.40 | 1.53 | 0.19 | 0.13 | 1.29 | 1.52 | 0.19 |
| f/f5 | −1.5 | −2.17 | −2.22 | −2.2 | −2.26 | −1.88 | −1.65 | −2.32 | −2.11 | −1.4 |

Reference throughout this specification to "an embodiment", "some embodiments", "one embodiment", "another example", "an example", "a specific example", or "some examples", means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example", "in an example", "in a specific example", or "in some examples", in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments of the present invention have been shown and described, it would be appreciated by those ordinary skilled in the art that various changes, modifications, alternatives and variants can be made in these embodiments without departing from principles and spirits of the present invention, and the scope of the present invention is restricted by claims and their equivalents.

What is claimed is:

1. A camera lens assembly, comprising a first lens, a second lens, a third lens, a fourth lens and a fifth lens from an object side of the camera lens assembly to an image side of the camera lens assembly in turn, wherein
    the first lens is of a positive focal power, an object side surface of the first lens is convex and an image side surface of the first is concave;
    the second lens is of a focal power;
    the third lens is of a negative focal power;
    the fourth lens is of a positive focal power, an image side surface of the fourth lens is convex;
    the fifth lens is of a negative focal power, and at least one inflection point is present in at least one of object and image side surfaces of the fifth lens;
    the camera lens assembly comprises:
    an aperture stop arranged between a subject and the second lens;
    the camera lens assembly meets the following formulas:

$TTL/2Y \leq 0.7$;

$-0.7 < f/f3 < -0.3$; and $-0.6 < (R1-R2)/(R1+R2) < -0.3$, wherein TTL is a total length of the camera lens assembly,
    Y equals to half-length of a diagonal of an effective pixel region at an imaging side surface,
    f represents an effective focal length of the camera lens assembly,
    f3 represents an effective focal length of the third lens,
    R1 represents a curvature radius of the object side surface of the first lens, and
    R2 represents a curvature radius of the image side surface of the first lens.

2. The camera lens assembly according to claim 1, wherein the first lens is made of a glass or plastic material.

3. The camera lens assembly according to claim 2, wherein an object side surface of the second lens is concave, and an image side surface of the second lens is convex.

4. The camera lens assembly according to claim 1, wherein the camera lens assembly meets the following formula:

$V1-V3 > 30$, wherein V1 represents an abbe coefficient of the first lens, and
    V3 represents an abbe coefficient of the third lens.

5. The camera lens assembly according to claim 4, wherein an object side surface of the second lens is concave, and an image side surface of the second lens is convex.

6. The camera lens assembly according to claim 1, wherein the camera lens assembly meets the following formula:

$$-0.7 < SAG42/SD42 < -0.3,$$

wherein SAG42 is a sagittal height of the image side surface of the fourth lens, and SD42 is a maximal effective radius of the image side surface of the fourth lens.

7. The camera lens assembly according to claim 6, wherein an object side surface of the second lens is concave, and an image side surface of the second lens is convex.

8. The camera lens assembly according to claim 1, wherein the camera lens assembly meets the following formula:

$$-0.75 < f1/f3 < -0.35,$$

wherein f1 represents an effective focal length of the first lens.

9. The camera lens assembly according to claim 8, wherein an object side surface of the second lens is concave, and an image side surface of the second lens is convex.

10. The camera lens assembly according to claim 1, wherein the camera lens assembly meets the following formulas:

$$0.5 < f/f4 < 2.5; \text{ and}$$

$$R6/R7 > 0,$$

wherein f4 represents an effective focal length of the fourth lens,

R6 represents a curvature radius of an image side surface of the third lens, and R7 represents a curvature radius of an object side surface of the fourth lens.

11. The camera lens assembly according to claim 10, wherein an object side surface of the second lens is concave, and an image side surface of the second lens is convex.

12. The camera lens assembly according to claim 1, wherein the camera lens assembly meets the following formula:

$$-3 < f/f5 < -1,$$

wherein f5 represents an effective focal length of the fifth lens.

13. The camera lens assembly according to claim 12, wherein an object side surface of the second lens is concave, and an image side surface of the second lens is convex.

14. The camera lens assembly according to claim 1, wherein an object side surface of the second lens is concave, and an image side surface of the second lens is convex.

15. The camera lens assembly according to claim 14, wherein an object side surface of the third lens is concave.

16. The camera lens assembly according to claim 15, wherein the image side surface of the fifth lens is concave.

17. The camera lens assembly according to claim 1, wherein an object side surface of the second lens is concave, and an image side surface of the second lens is convex.

\* \* \* \* \*